US012652715B2

(12) United States Patent
Hu et al.

(10) Patent No.: US 12,652,715 B2
(45) Date of Patent: Jun. 9, 2026

(54) METHODS AND SYSTEMS FOR MULTI-LINK OPERATIONS

(71) Applicant: Meta Platforms Technologies, LLC, Menlo Park, CA (US)

(72) Inventors: Chunyu Hu, Saratoga, CA (US); Payam Torab Jahromi, Laguna Niguel, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 573 days.

(21) Appl. No.: 17/491,959

(22) Filed: Oct. 1, 2021

(65) Prior Publication Data

US 2022/0124855 A1 Apr. 21, 2022

Related U.S. Application Data

(60) Provisional application No. 63/092,159, filed on Oct. 15, 2020.

(51) Int. Cl.
| | |
|---|---|
| *H04W 76/15* | (2018.01) |
| *H04W 76/25* | (2018.01) |
| *H04W 76/34* | (2018.01) |

(52) U.S. Cl.
CPC ........... *H04W 76/15* (2018.02); *H04W 76/25* (2018.02); *H04W 76/34* (2018.02)

(58) Field of Classification Search
CPC ..... H04W 76/15; H04W 76/25; H04W 76/34; H04W 84/12
See application file for complete search history.

(56) References Cited

U.S. PATENT DOCUMENTS

| | | | |
|---|---|---|---|
| 2020/0021400 A1 | 1/2020 | Cherian et al. | |
| 2021/0007168 A1* | 1/2021 | Asterjadhi | ........ H04W 52/0235 |

(Continued)

FOREIGN PATENT DOCUMENTS

| | | |
|---|---|---|
| CN | 111416874 A | 7/2020 |
| JP | 2018535591 A | 11/2018 |

(Continued)

OTHER PUBLICATIONS

Au E., "Compendium of Straw Polls and Potential Changes to the Specification Framework Document," IEEE Draft, 11-20-0566-73-00BE-Compendium-of-Straw-Polls-and-Potential-Changes-to-the-Specification-Framework-Document, IEEE-SA Mentor, No. 73, Oct. 13, 2020, 196 pages, XP068173772, Retrieved from the Internet, https://mentor.ieee.org/802.11/dcn/20/11-20-0566-73-00be-compendium-of-straw-polls-and-potential-changes-to-the-specification-framework-document.docx.

(Continued)

*Primary Examiner* — Kan Yuen
(74) *Attorney, Agent, or Firm* — Foley & Lardner LLP

(57) ABSTRACT

Disclosed herein includes A first wireless multilink device (MLD) including a transceiver configured to send, to a second wireless MLD, a request for multi-link reconfiguration. The transceiver may be configured to receive, from the second wireless MLD, a response to the request for the multi-link reconfiguration. The multi-link reconfiguration may include configuring to implement at least one of: adding a link, removing a link or switching one end of a link, between the first wireless MLD and the second wireless MLD. The first wireless MLD and the second wireless MLD may maintain connection via at least one link during the multi-link reconfiguration.

19 Claims, 19 Drawing Sheets

(56)　　References Cited

U.S. PATENT DOCUMENTS

| | | | | |
|---|---|---|---|---|
| 2021/0045175 A1* | 2/2021 | Huang | H04L 5/0053 | |
| 2021/0068171 A1* | 3/2021 | Hsu | H04W 74/002 | |
| 2021/0112414 A1* | 4/2021 | Huang | H04W 12/122 | |
| 2021/0274378 A1* | 9/2021 | Chen | H04W 48/14 | |
| 2021/0321243 A1* | 10/2021 | Patil | H04W 76/15 | |
| 2021/0385692 A1* | 12/2021 | Kwon | H04W 28/24 | |
| 2022/0287121 A1* | 9/2022 | Hwang | H04W 76/15 | |
| 2023/0024407 A1* | 1/2023 | Gan | H04W 48/16 | |
| 2023/0046270 A1* | 2/2023 | Huang | H04W 40/12 | |
| 2023/0072177 A1* | 3/2023 | Guo | H04W 48/14 | |
| 2023/0115361 A1* | 4/2023 | Kim | H04W 76/15 | |
| | | | 370/311 | |
| 2023/0156840 A1* | 5/2023 | Chitrakar | H04W 76/15 | |
| | | | 370/329 | |
| 2023/0180106 A1* | 6/2023 | Ding | H04W 48/12 | |
| | | | 370/328 | |
| 2023/0180323 A1* | 6/2023 | Sang | H04W 8/22 | |
| | | | 370/329 | |
| 2023/0224996 A1* | 7/2023 | Kim | H04W 76/15 | |
| | | | 370/329 | |
| 2023/0254802 A1* | 8/2023 | Kim | H04W 76/11 | |
| | | | 370/329 | |
| 2023/0319922 A1* | 10/2023 | Lu | H04W 76/15 | |
| | | | 370/328 | |

FOREIGN PATENT DOCUMENTS

| | | | |
|---|---|---|---|
| TW | 201921986 A | 6/2019 | |
| WO | 2020040589 A1 | 2/2020 | |

OTHER PUBLICATIONS

Chitrakar R., "Multi-Link Setup Clarifications," IEEE Draft, 11-20-0751-01-00BE-Multi-Link-Setup-Clarifications, No. 1, Jul. 21, 2020, pp. 1-18, XP068170148, Retrieved from the Internet, https://mentor.ieee.org/802.11/dcn/20/11-20-0751-01-00be-multi-link-setup-clarifications.pptx.

International Search Report and Written Opinion for International Application No. PCT/US2021/055013, mailed Jan. 14, 2022, 13 pages.

Monajemi P., et al., "Dynamic Link Set," IEEE Draft, 11-20-0810-01-00BE-Dynamic-Link-Set, IEEE-SA Mentor, vol. 802.11, No. 1, Jul. 22, 2020, pp. 1-11, XP068170168, Retrieved from the Internet, https://mentor.ieee.org/802.11/dcn/20/11-20-0810-01-00be-dynamic-link-set.pptx.

Torab P., et al., "ML Reconfiguration," IEEE Draft, 11-20-1554-04-00BE-ML-Reconfiguration, IEEE-SA Mentor, vol. 802.11, No. 4, Jan. 21, 2021, pp. 1-26, XP068175934, Retrieved from the Internet, https://mentor.ieee.org/802.11/dcn/20/11-20-1554-04-00beml-reconfiguration.pptx.

Office Action mailed Mar. 18, 2025 for Chinese Application No. 202180071065.3, filed Oct. 14, 2021, 8 pages.

Office Action mailed Apr. 22, 2025 for Japanese Application No. 2023-519610, filed on Oct. 14, 2021, 4 pages.

Office Action mailed Feb. 25, 2025 for Taiwan Application No. 110138152, filed Oct. 14, 2021, 16 pages.

* cited by examiner

TID switch 1010

Channel switch 1020

Link enablement/disablement 1030

| Value | Meaning | Time priority |
|---|---|---|
| 0 | TID-To-Link Mapping Request | No |
| 1 | TID-To-Link Mapping Response | No |
| 2 | TID-To-Link Mapping Teardown | No |
| 3 | NSEP Priority Access Enable Request | No |
| 4 | NSEP Priority Access Enable Response | No |
| 5 | NSEP Priority Access Teardown | No |
| 6-255 | | |

*1212*

| | | |
|---|---|---|
| 6 | ML Reconfiguration Request | No |
| 7 | ML Reconfiguration Response | No |

*1214*

*1210*

| Order | Information |
|---|---|
| 1 | Category |
| 2 | EHT Action |
| 3 | Dialog Token |
| 4 | Status Code |
| 5 | ML Reconfiguration Variant Multi-Link IE |

| FT Action field value | Description |
|---|---|
| 0 | Reserved |
| 1 | FT Request frames |
| 2 | FT Response frames |
| 3 | FT Confirm frames |
| 4 | FT Ack frames |
| 5--255 | Reserved |
| 6 | ML Reconfiguration Request |
| 7 | ML Reconfiguration Response |

1310

| Order | Information |
|---|---|
| 1 | Category |
| 2 | FT Action |
| 3 | Dialog Token |
| 4 | Status Code |
| 5 | ML Reconfiguration Variant Multi-Link IE |

| Category | WNM Action | Dialog Token | BTM Status Code | BSS Termination Delay | Target BSSID (Optional) | BSS Transition Candidate List Entries (Optional) |
|---|---|---|---|---|---|---|
| 1511 | 1512 | 1513 | 1514 | 1515 | 1516 | 1517 |

Octets:   1    1    1    1    1    0 or 6    variable

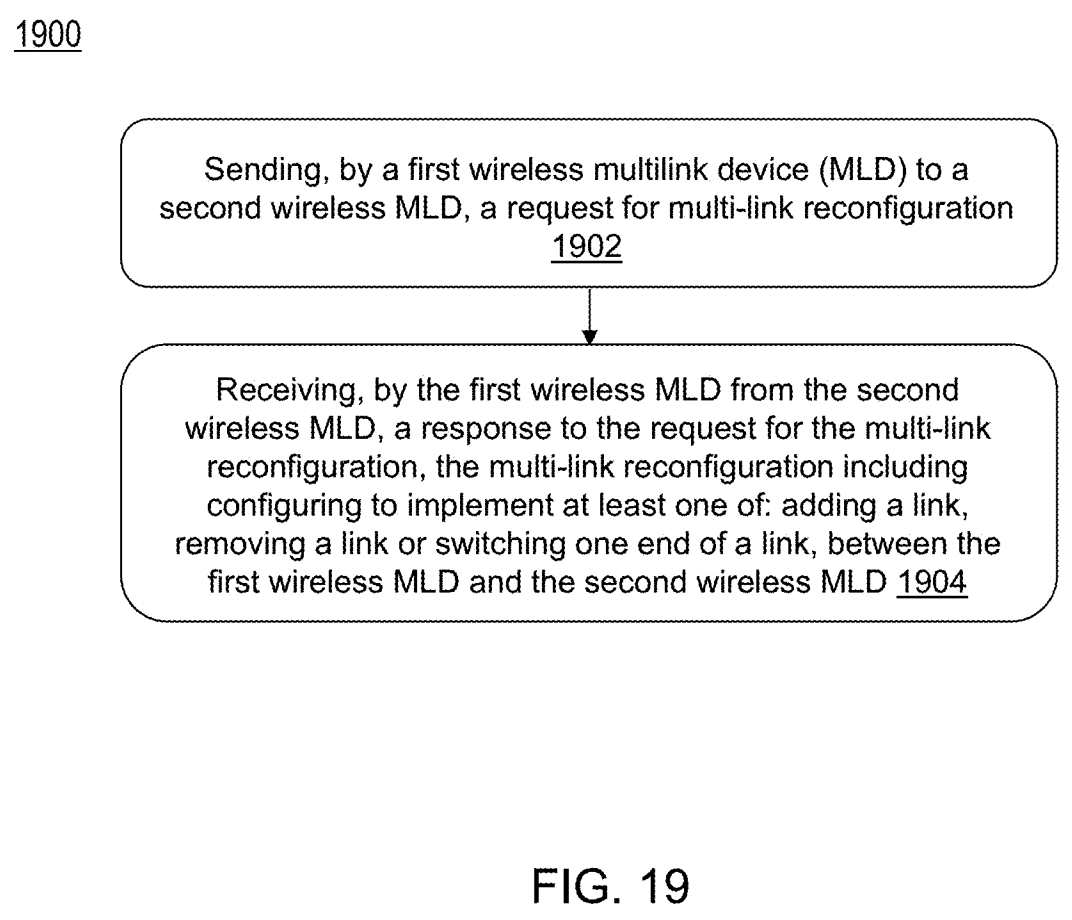

1900

Sending, by a first wireless multilink device (MLD) to a second wireless MLD, a request for multi-link reconfiguration 1902

Receiving, by the first wireless MLD from the second wireless MLD, a response to the request for the multi-link reconfiguration, the multi-link reconfiguration including configuring to implement at least one of: adding a link, removing a link or switching one end of a link, between the first wireless MLD and the second wireless MLD 1904

FIG. 19

METHODS AND SYSTEMS FOR MULTI-LINK OPERATIONS

CROSS-REFERENCE TO RELATED APPLICATION

This application claims priority to and the benefit of U.S. Provisional Application No. 63/092,159, filed Oct. 15, 2020, entitled "METHODS AND SYSTEMS FOR MULTI-LINK OPERATION", which is incorporated herein by reference in its entirety for all purposes.

FIELD OF DISCLOSURE

The present disclosure is generally related to use of communication links, including but not limited to reducing latency in communication for artificial reality.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Disclosed herein are related to a first wireless multilink device (MLD) including a transceiver configured to send, to a second wireless MLD, a request for multi-link reconfiguration. The transceiver may be configured to receive, from the second wireless MLD, a response to the request for the multi-link reconfiguration. The multi-link reconfiguration may include configuring to implement at least one of: adding a link, removing a link or switching one end of a link, between the first wireless MLD and the second wireless MLD. The first wireless MLD and the second wireless MLD may maintain connection via at least one link (that is not involved in the multi-link reconfiguration) during the multi-link reconfiguration.

In some embodiments, the first wireless MLD is an access point (AP) MLD, and the second wireless MLD is a non-AP MLD, or the first wireless MLD is a non-AP MLD, and the second wireless MLD is an AP MLD. The link may be between an AP station (STA) of the AP MLD and a non-AP STA of the non-AP MLD. In some embodiments, the request may include an ML reconfiguration message. The request may include a ML reconfiguration information element (IE), the ML reconfiguration IE including a link-mapping information field for the AP STA or the non-AP STA. In some embodiments, the ML reconfiguration IE may be a variant ML reconfiguration IE. In some embodiments, the link-mapping information field may be a per link information field for each STA that a new mapping involves. In some embodiments, the link-mapping information field may include at least one of: an action field, an AP end point description, or a non-AP STA end point description. The action field may include a value indicative of: adding the link, removing the link or switching one end of the link, between the first wireless MLD and the second wireless MLD.

In some embodiments, the first wireless MLD may send a notification including a first recommendation to the second wireless MLD. The first wireless MLD sending the notification to the second wireless MLD may be an AP MLD and the second wireless MLD may be a non-AP MLD. In some embodiments, in response to receiving the notification, the second wireless MLD may modify the first recommendation and generate a modified first recommendation, and send a second request including the modified first recommendation to the first wireless MLD. In response to receiving the request, the first wireless MLD may determine whether the second request is accepted or rejected, and send a second response including a result of the determination to the second wireless MLD. The notification may include a first variant ML reconfiguration IE indicating the first recommendation. The notification may include a first variant ML reconfiguration IE indicating the first recommendation. The request may include a second variant ML reconfiguration IE indicating the modified first recommendation. The response may include a third variant ML reconfiguration IE indicating the result of the determination whether the second request is accepted or rejected. In some embodiments, the third variant ML reconfiguration IE may include a new configuration unilaterally decided by the first wireless MLD.

In some embodiments, the request and the response each may include an extremely high throughput (EHT) action frame, and a fast transition action frame. In some embodiments, the request may include a basic service set (BSS) transition management request frame including at least one of: an indication that the request is for multi-link configuration, or a BSS transition candidate list entries field that indicates zero or more of: neighbor report elements, reduced neighbor report elements or basic variant multi-link elements.

In some embodiments, the response may include a basic service set (BSS) transition management response frame including a BSS transition candidate list entries field that indicates zero or more of: neighbor report elements, reduced neighbor report elements or basic variant multi-link elements.

Various embodiments disclosed herein are related to a method including sending, by a first wireless multilink device (MLD) to a second wireless MLD, a request for multi-link reconfiguration. The method may include receiving, by the first wireless MLD from the second wireless MLD, a response to the request for the multi-link reconfiguration. The multi-link reconfiguration may include configuring to implement at least one of: adding a link, removing a link or switching one end of a link, between the first wireless MLD and the second wireless MLD. The first wireless MLD and the second wireless MLD may maintain connection via at least one link during the multi-link reconfiguration, so that traffic on the at least one link is supported (although the traffic may be affected by the multi-link reconfiguration, e.g., due to higher traffic load being redirected to the at least one link that is not undergoing multi-link reconfiguration).

In some embodiments, the first wireless MLD may be an access point (AP) MLD, and the second wireless MLD may be a non-AP MLD, or the first wireless MLD may be a non-AP MLD, and the second wireless MLD may be an AP MLD. The link may be between an AP station (STA) of the AP MLD and a non-AP STA of the non-AP MLD. In some embodiments, the request may include an ML reconfiguration message. The request may include a ML reconfiguration information element (IE), the ML reconfiguration IE including a link-mapping information field for the AP STA or the non-AP STA. In some embodiments, the ML reconfiguration IE may be a variant ML reconfiguration IE. In some embodiments, the link-mapping information field may be a per link information field for each STA that a new mapping involves. The link-mapping information field may include at least one of: an action field, an AP end point description, or a non-AP STA end point description. The action field may include a value indicative of: adding the link, removing the link or switching one end of the link, between the first wireless MLD and the second wireless MLD.

In some embodiments, the first wireless MLD may send a notification including a first recommendation to the second wireless MLD. The first wireless MLD sending the notification to the second wireless MLD may be an AP MLD and the second wireless MLD may be a non-AP MLD. In some embodiments, in response to receiving the notification, the second wireless MLD may modify the first recommendation and generate a modified first recommendation, and send a second request including the modified first recommendation to the first wireless MLD. In response to receiving the request, the first wireless MLD may determine whether the second request is accepted or rejected, and send a second response including a result of the determination to the second wireless MLD. The notification may include a first variant ML reconfiguration IE indicating the first recommendation. The notification may include a first variant ML reconfiguration IE indicating the first recommendation. The request may include a second variant ML reconfiguration IE indicating the modified first recommendation. The response may include a third variant ML reconfiguration IE indicating the result of the determination whether the second request is accepted or rejected. In some embodiments, the third variant ML reconfiguration IE may include a new configuration unilaterally decided by the first wireless MLD.

In some embodiments, the request and the response each may include an enhanced trigger (EHT) action frame and a fast transition action frame. In some embodiments, the request may include a basic service set (BSS) transition management request frame including at least one of: an indication that the request is for multi-link configuration, or a BSS transition candidate list entries field that indicates zero or more of: neighbor report elements, reduced neighbor report elements or basic variant multi-link elements.

In some embodiments, the response may include a basic service set (BSS) transition management response frame including a BSS transition candidate list entries field that indicates zero or more of: neighbor report elements, reduced neighbor report elements or basic variant multi-link elements.

In some embodiments, the request may include a recommended configuration for the multi-link reconfiguration. The response may include an indication of accepting the recommended configuration, or at least one of an indication of rejecting the recommended configuration, or an alternative recommended configuration for the multi-link reconfiguration.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 12 is a diagram showing example protected Extremely High Throughput (EHT) Action field values (which define frame types) and an example frame or field structure of ML Reconfiguration Request and Response, according to an example implementation of the present disclosure.

FIG. 13 is a diagram showing example Fast Transition (FT) Action field values (which define frame types) and an example frame or field structure of ML Reconfiguration Request and Response, according to an example implementation of the present disclosure.

FIG. 19 is a flow chart illustrating a method for performing a ML reconfiguration, according to another example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for remotely rendering an artificial reality space (e.g., an AR space, a VR space, or a MR space) by adaptively allocating resources or time slots for communication of data based on utilization and priorities of channel access.

Also disclosed herein are embodiments related to a first wireless multilink device (MLD) including a transceiver configured to send, to a second wireless MLD, a request for multi-link reconfiguration. The transceiver may be configured to receive, from the second wireless MLD, a response to the request for the multi-link reconfiguration. The multi-link reconfiguration may include configuring to implement at least one of: adding a link, removing a link or switching one end of a link, between the first wireless MLD and the second wireless MLD. The first wireless MLD and the second wireless MLD may maintain connection (e.g., staying connected, for instance to support/communicate/exchange traffic) via at least one link during the multi-link reconfiguration.

Further disclosed herein are embodiments related to a method including sending, by a first wireless multilink device (MLD) to a second wireless MLD, a request for multi-link reconfiguration. The method may include receiving, by the first wireless MLD from the second wireless MLD, a response to the request for the multi-link reconfiguration. The multi-link reconfiguration may include configuring to implement at least one of: adding a link, removing a link or switching one end of a link, between the first wireless MLD and the second wireless MILD.

Figure 1:
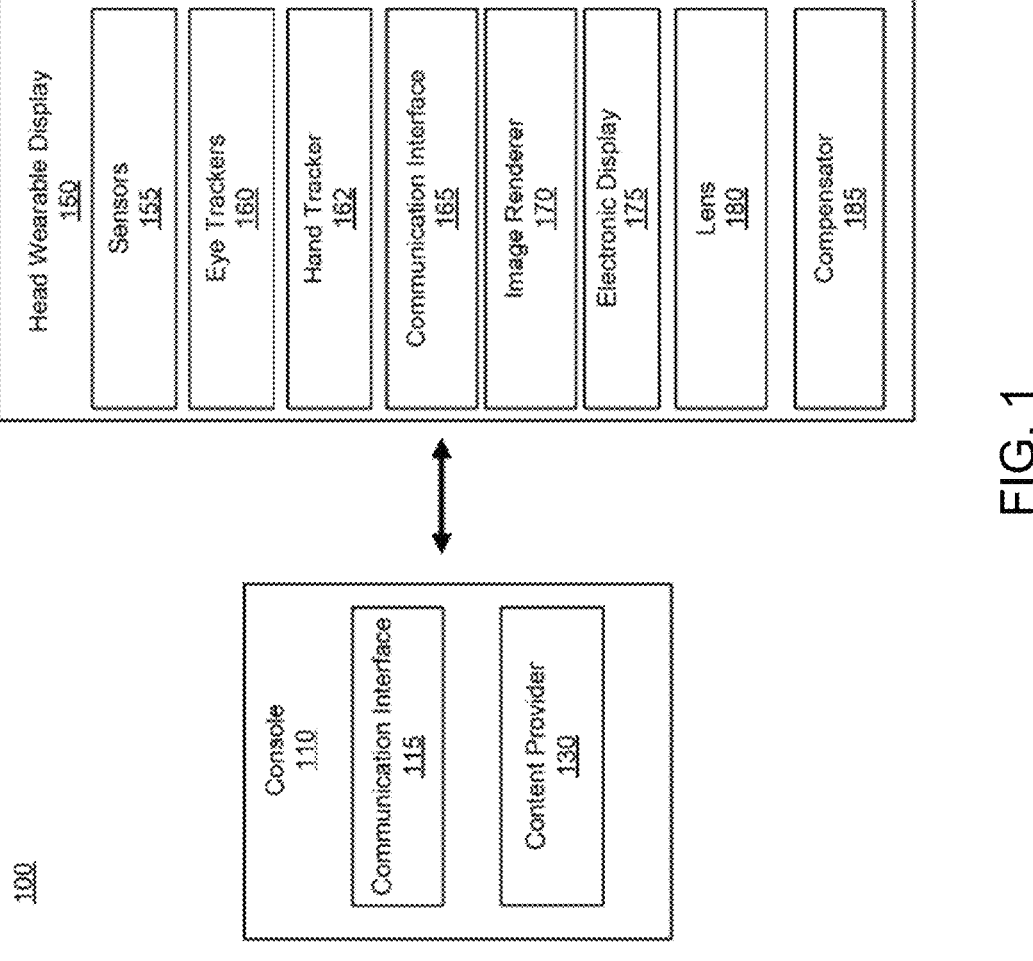
FIG. 1 is a diagram of a system environment including an artificial reality system, according to an example implementation of the present disclosure.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HDM 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
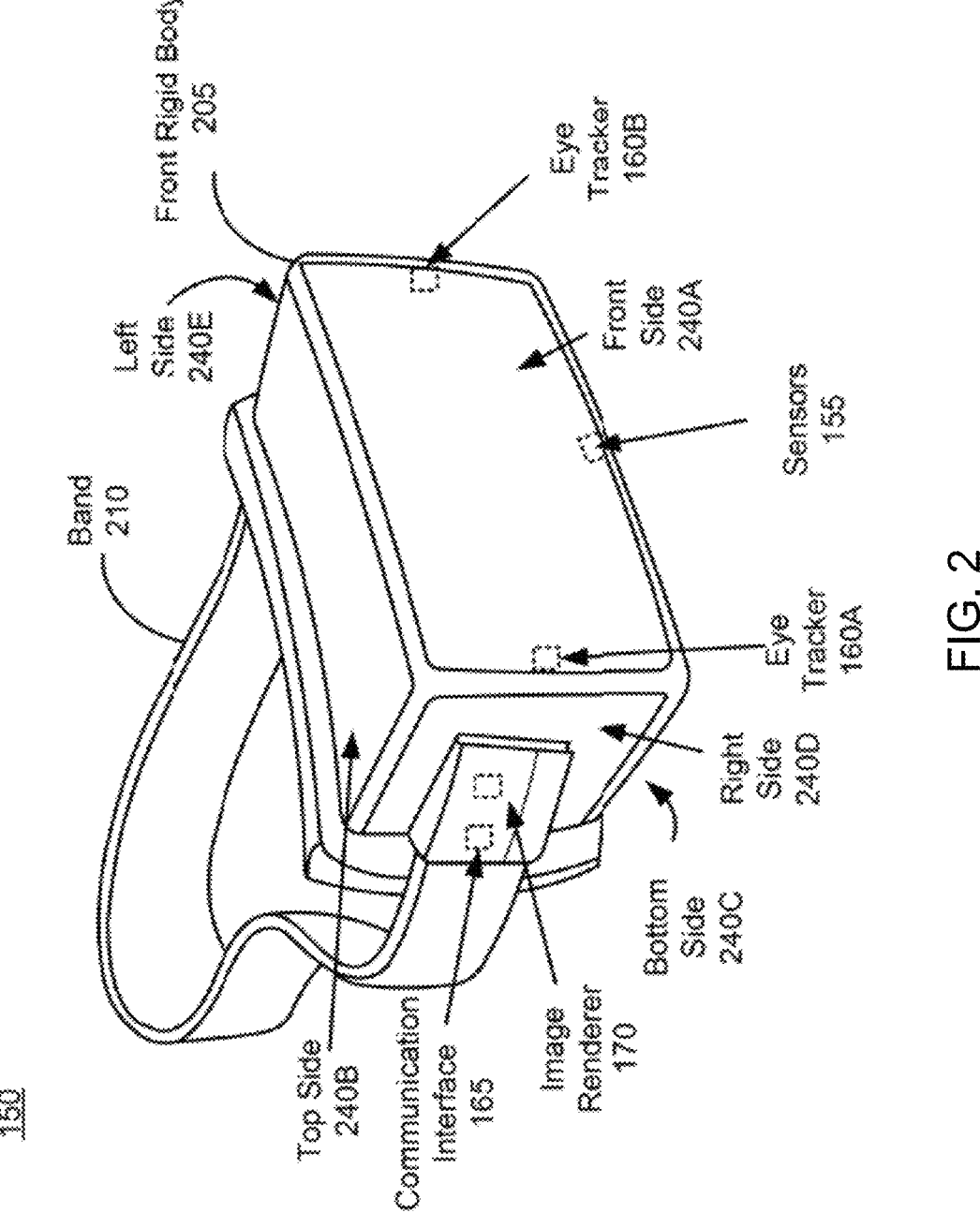
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
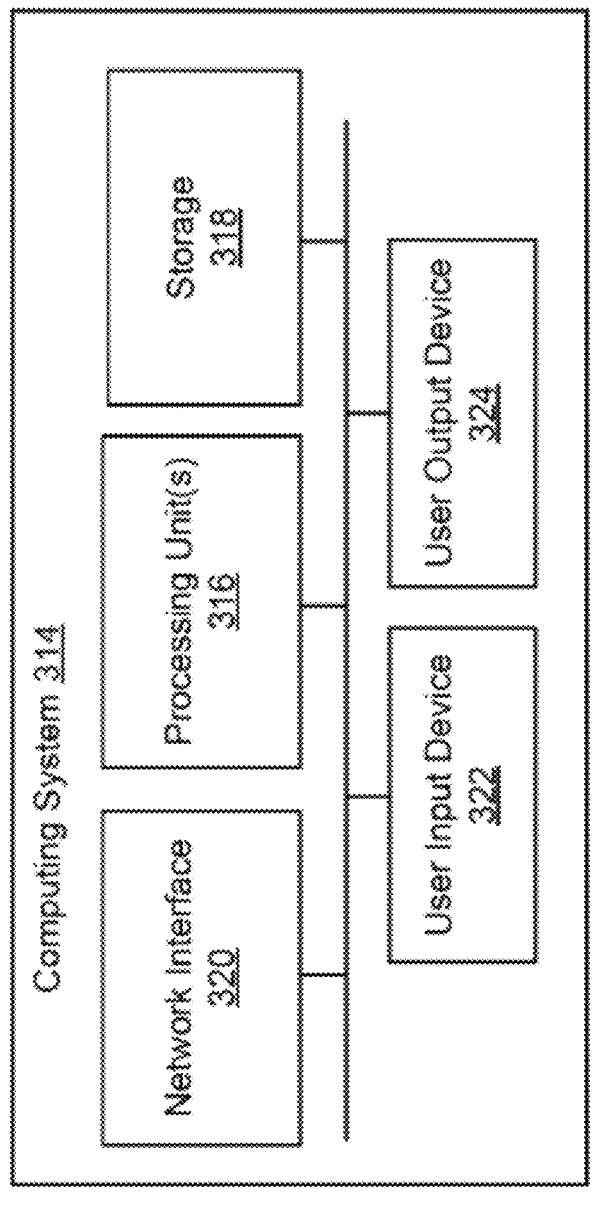
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 720 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 722 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Multi-link operation (MLO) is an established feature of 802.11be. In MLO operations, STA (e.g., endpoint, terminal) entities within multi-link devices (MLDs) can form connections referred to as links. Here, an MLD is a device that can perform transmissions and receptions on more than one wireless interface link. A link is a pairing of one AP STA of an AP MLD and one non-AP STA of an associated non-AP MLD. A mapping between AP and non-AP STA entities of two associated MLDs is referred to as the "Multi-Link (ML) configuration."

One problem relates to performing a multi-link configuration (ML configuration) and a ML reconfiguration, e.g., changing or reconfiguring a ML configuration. This may involve performing a post-association change in the mapping of STA entities of MLDs. There are MLO scenarios that may change the ML configuration established at an association time. For example, an ML configuration may be changed when (1) radio and/or processing core becomes available/unavailable due to maintenance, hardware additions, hardware failure, upgrades, etc. (device centric scenario), (2) reachability and/or range changes (environment or mobility change related scenario), (3) traffic condition changes (for example, static or permanent increase in traffic or static or permanent decrease in traffic) or (4) details of deciding the ML configuration at the association time may not be clear. It may be beneficial to make transition(s) in ML configuration as transparent as possible to avoid disrupting the connection or data service or degrading their quality.

To solve these problems, according to certain aspects, embodiments in the present disclosure relate to techniques for changing or reconfiguring a ML configuration to change in ML configuration as transparent as possible to avoid disrupting the connection or data service or degrading their quality.

In some embodiments, a first wireless multilink device (MLD) may include a transceiver configured to send, to a second wireless MLD, a request for multi-link reconfiguration. The transceiver may be configured to receive, from the second wireless MLD, a response to the request for the multi-link reconfiguration. The multi-link reconfiguration may include configuring to implement at least one of: adding a link, removing a link or switching one end of a link, between the first wireless MLD and the second wireless MLD. The first wireless MLD and the second wireless MLD may maintain connection via at least one link during the multi-link reconfiguration, so as to communicate traffic or keep the ability to support traffic on the at least one link during the multi-link reconfiguration.

In some embodiments, the first wireless MLD is an access point (AP) MLD, and the second wireless MLD is a non-AP MLD, or the first wireless MLD is a non-AP MLD, and the second wireless MLD is an AP MLD. The link may be between an AP station (STA) of the AP MLD and a non-AP STA of the non-AP MLD. In some embodiments, the request may include an ML reconfiguration message. The request may include a ML reconfiguration information element (IE), the ML reconfiguration IE including a link-mapping information field for the AP STA or the non-AP STA. In some embodiments, the ML reconfiguration IE may be a variant ML reconfiguration IE. In some embodiments, the link-mapping information field may be a per link information field for each STA that a new mapping involves. In some embodiments, the link-mapping information field may include at least one of: an action field, an AP end point description, or a non-AP STA end point description. The action field may include a value indicative of: adding the link, removing the link or switching one end of the link, between the first wireless MLD and the second wireless MLD.

In some embodiments, the first wireless MLD may send a notification including a first recommendation to the second wireless MLD. The first wireless MLD sending the notification to the second wireless MLD may be an AP MLD and the second wireless MLD may be a non-AP MLD. In some embodiments, in response to receiving the notification, the second wireless MLD may modify/update/adjust the first recommendation and may generate/offer/provide a modified first recommendation, and send a second request including the modified first recommendation to the first wireless MLD. In response to receiving the request, the first wireless MLD may determine/decide whether the second request is accepted or rejected, and may send a second response including a result of the determination to the second wireless MLD. The notification may include a first variant ML reconfiguration IE indicating/including/incorporating/reflecting the first recommendation. The notification may include a first variant ML reconfiguration IE indicating/including the first recommendation. The request may include a second variant ML reconfiguration IE indicating/including the modified first recommendation. The response may include a third variant ML reconfiguration IE indicating/including the result of the determination whether the second request is accepted or rejected. In some embodiments, the third variant ML reconfiguration IE may include a new configuration unilaterally decided/implemented by the first wireless MLD.

In some embodiments, the request and the response each may include an extremely high throughput (EHT) action frame, and a fast transition action frame. In some embodiments, the request may include a basic service set (BSS) transition management request frame including at least one of: an indication that the request is for multi-link configuration, or a BSS transition candidate list entries field that indicates zero or more of: neighbor report elements, reduced neighbor report elements or basic variant multi-link elements.

In some embodiments, the response may include a basic service set (BSS) transition management response frame including a BSS transition candidate list entries field that indicates zero or more of: neighbor report elements, reduced neighbor report elements or basic variant multi-link elements.

Embodiments in the present disclosure can have the following advantages.

First, some embodiments can provide useful techniques for changing an ML configuration when (1) radio and/or processing core becomes available/unavailable due to maintenance, hardware additions, hardware failure, upgrades, etc. (device centric scenario), (2) reachability and/or range changes (environment or mobility change related scenario), (3) traffic condition changes (for example, static or permanent increase in traffic or static or permanent decrease in traffic) or (4) details of deciding the ML configuration at the association time may not be clear. Some embodiments can make transition in ML configuration as transparent as possible to avoid disrupting the connection or data service or degrading their quality.

Second, some embodiments can provide useful techniques for adding a new link between MLDs due to (1) traffic load increase (e.g., congestion or link loss or just traffic engineering at a particular radio channel), (2) changes of current channel condition (e.g., range, reachability, etc.), or (3) a new application starting to run, which may use a new radio purposed for the type of the new application (e.g., activating a new 6 GHz radio in response to a virtual reality (VR) application request).

Third, some embodiments can provide useful techniques for removing a link between MLDs. A link can be removed because operating on all available links may not always be the best option due to a variety of reasons. For example, a link can be removed (1) for improved efficiency or power save, (2) for less management overhead, or (3) to stick with a dominant traffic component (e.g., keeping a Traffic ID (TID) with 5% of the traffic together with the only other TID carrying 95%, in one link).

Figure 4:
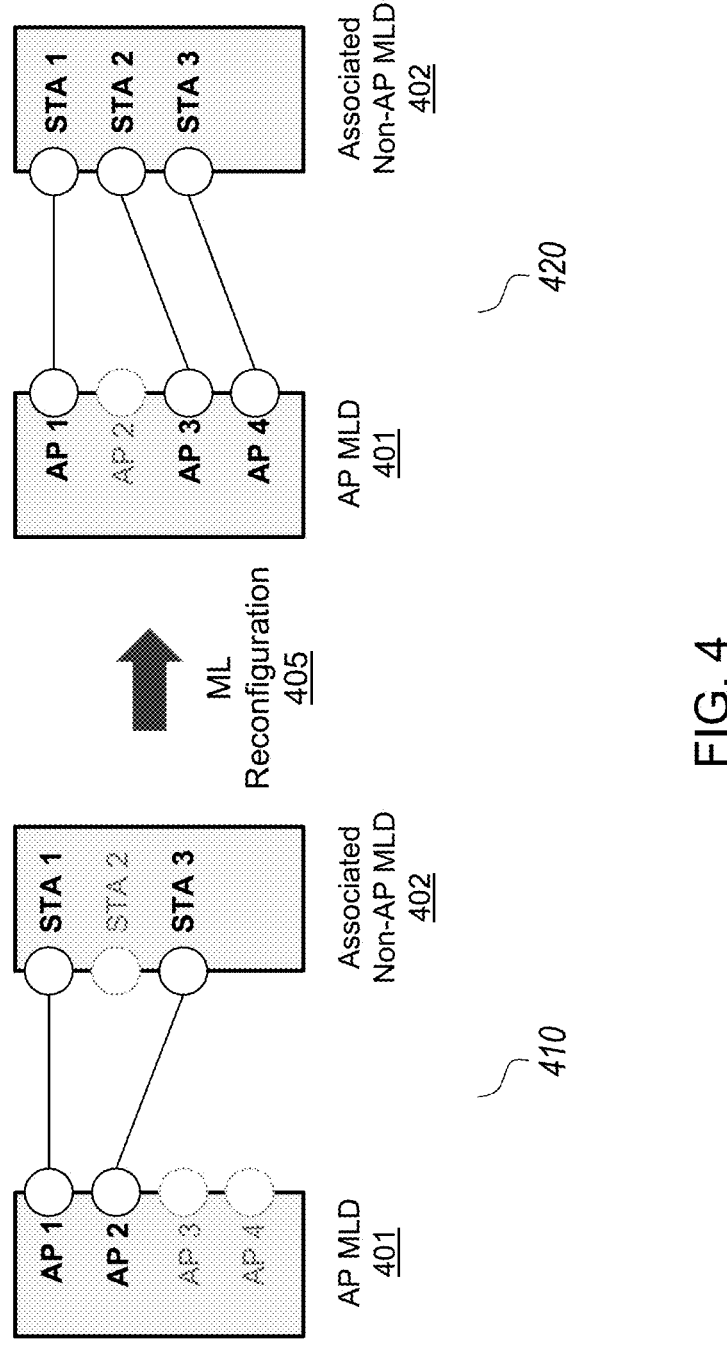
FIG. 4 is a diagram of an example multi-link (ML) reconfiguration according to an example implementation of the present disclosure.

FIG. 4 is a diagram of an example multi-link (ML) reconfiguration according to an example implementation of the present disclosure. In some embodiments, a ML configuration may include changing/updating/adjusting/reconfiguring in the number of links. For example, referring to FIG. 4, a ML configuration 410 in which an AP MLD 401 and a non-AP MLD 402 are paired or associated via two links, can be changed or reconfigured (ML reconfiguration 405) to a new ML configuration 420 in which the AP MLD 401 and the non-AP MLD 402 are paired or associated via three links.

Figure 5:
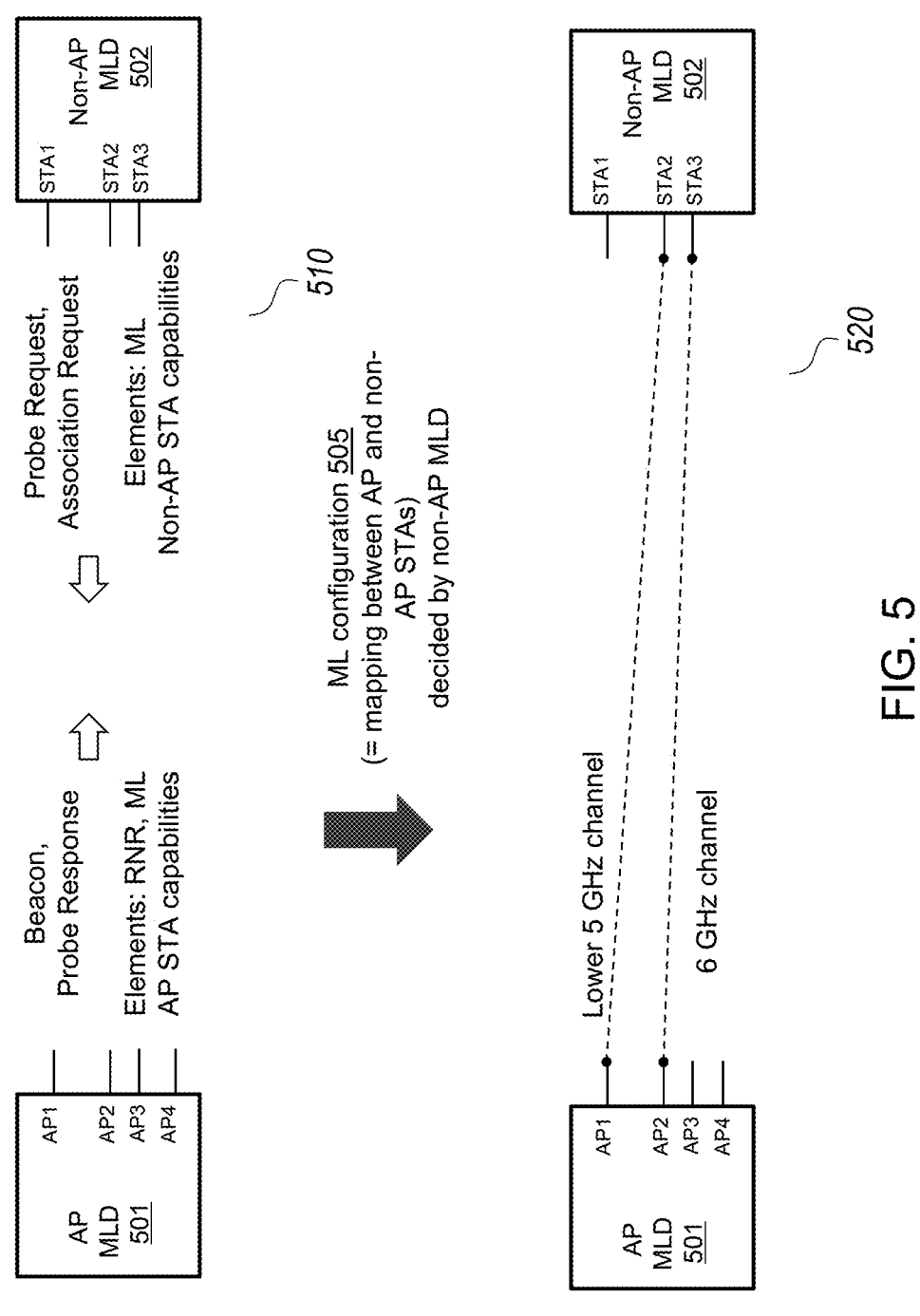
FIG. 5 is a diagram of an example ML configuration according to an example implementation of the present disclosure.

FIG. 5 is a diagram of an example ML configuration according to an example implementation of the present disclosure. In some embodiments, an ML configuration can be performed such that the ML configuration is decided/determined by a non-AP MLD at an association time. For example, referring to FIG. 5, in an initial environment 510 between MLDs, a non-AP MLD 502 may send/transmit, to an AP MLD 501, Probe Request or Association Request including a multi-link (ML) element and/or non-AP STA capabilities. In some embodiments, an ML element in Association Request may be an information element (IE) field. In response to receiving Probe Request or Association Request, the AP MLD 501 may send, to the non-AP MLD 502, Beacon or Probe Response including a Reduced Neighbor Report (RNR) element, a ML element, and AP STA capabilities. As a result of sending Beacon or Probe Response, the non-AP MLD 502 may determine or decide or perform a ML configuration 505 (e.g., mapping between AP and non-AP STAs). The non-AP MLD may determine or decide the number links between the non-AP MLD and the AP MLD. For example, as a result of the ML configuration, in a post-association environment 520, AP1 of the AP MLD 501 may be paired or associated with STA2 of the non-AP MLD 502 at a 5 GHz channel, and AP2 of the AP MLD 501 may be paired or associated with STA3 of the non-AP MLD 502 at a 6 GHz channel.

Figure 6:
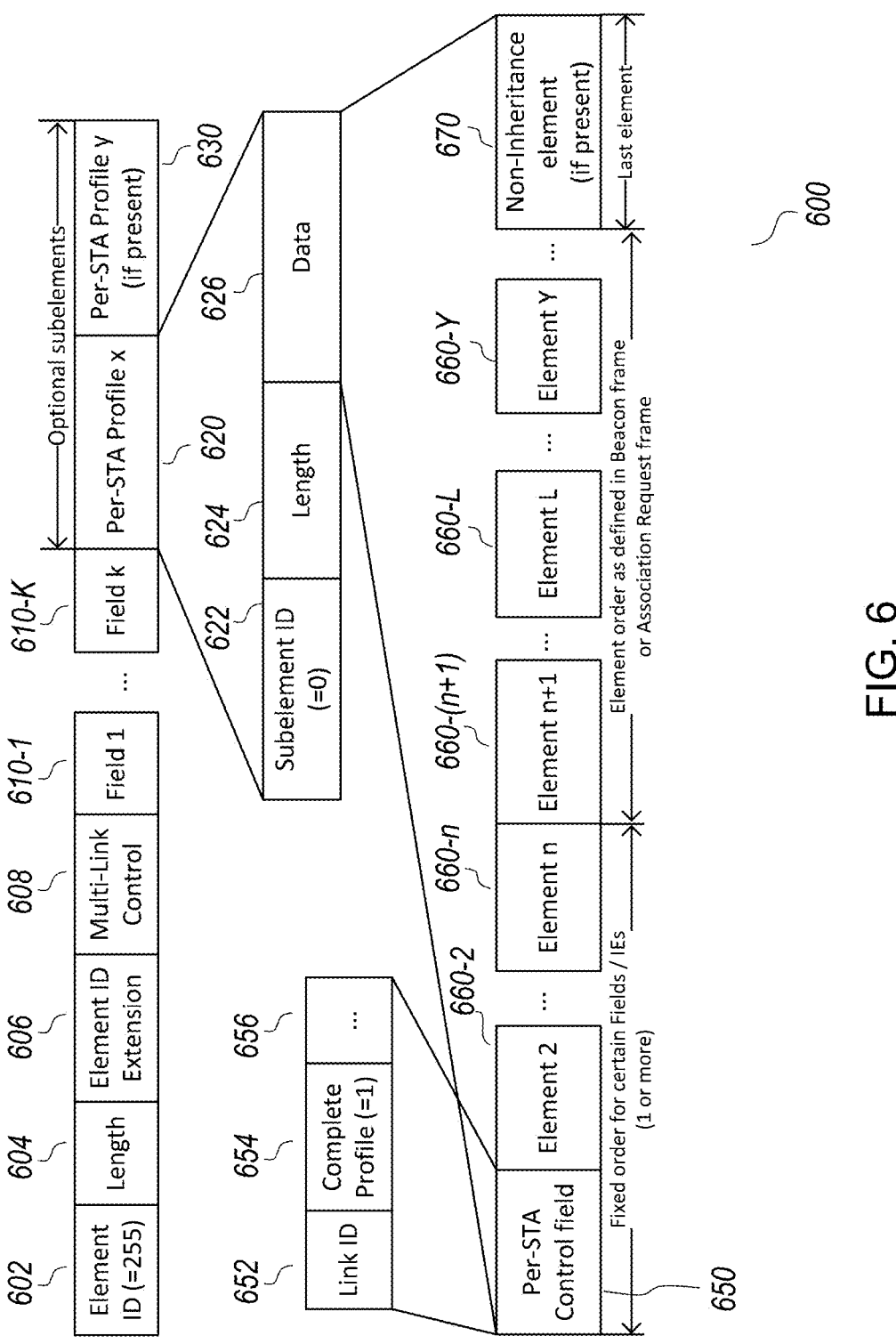
FIG. 6 is a diagram of an example frame or field structure of a ML element in a Beacon frame or an Association Request frame for an ML configuration, according to an example implementation of the present disclosure.

FIG. 6 is a diagram of an example frame or field structure of a ML element in a Beacon frame or an Association Request frame for an ML configuration, according to an example implementation of the present disclosure. In some embodiments, an ML element (e.g., information element (IE) field) in Association Request may carry Link ID (e.g., link ID 652 in FIG. 6) corresponding to each non-AP STA inside the non-AP MLD (e.g., STA1, STA2, STA3 in FIG. 5). For example, Association Request frame sent by the non-AP MLD 502 (see FIG. 5) may carry an ML element 600 as shown in FIG. 6. Referring to FIG. 6, the ML element 600 may include element ID 602, length 604, element ID extension 606, multi-link control 608, and a plurality of fields (610-1, . . . , 601-K). The ML element 600 may include optional fields, such as per-STA profile 620, and per-STA profile 630. The field of per-STA profile 620 may include supplement ID 622, length 624, and data 626. The data 626 may include (1) per-STA control field 650, (2) a plurality of information elements (IEs) in a fixed order (e.g., fields 660-2, . . . , 660-n), (3) a plurality of IEs in an order defined in Beacon frame or Association Request frame (e.g., 660-L, . . . , 660-Y, . . . ), and/or (4) a non-inheritance element 670 (which may be optional). The per STA control field 650 may include link ID 652, and complete profile 654, and other fields 656. More particularly, the ML element 600 may carry or contain the link ID 652 corresponding to each non-AP STA (e.g., STA1, STA2, STA3) inside the non-AP MLD 502.

In some embodiments, a desired ML configuration (e.g., a mapping between non-AP and AP STAs of MLDs) may be specified through the multi-link information element (ML IE) in Association Request (from STA). In some embodiments, an AP MLD (e.g., AP MLD 501 in FIG. 5) can reject the requested mapping for a variety of reasons (for example, a requested link is too congested, etc.). In some embodiments, a non-AP MLD can include, in the ML IE (e.g., ML element 600), more STA profiles (e.g., per-STA profile 620, per-STA profile 630 in FIG. 6) than those present in the mapping. In some embodiments, a non-AP MLD can include, in the ML IE, all of the available STA profiles (e.g., STA profiles of STA1, STA2, STA3 of the non-AP MLD 502 in FIG. 5. In this manner, the non-AP MLD can provide or give more information to AP to make recommendations at the association time or later.

Figure 7:
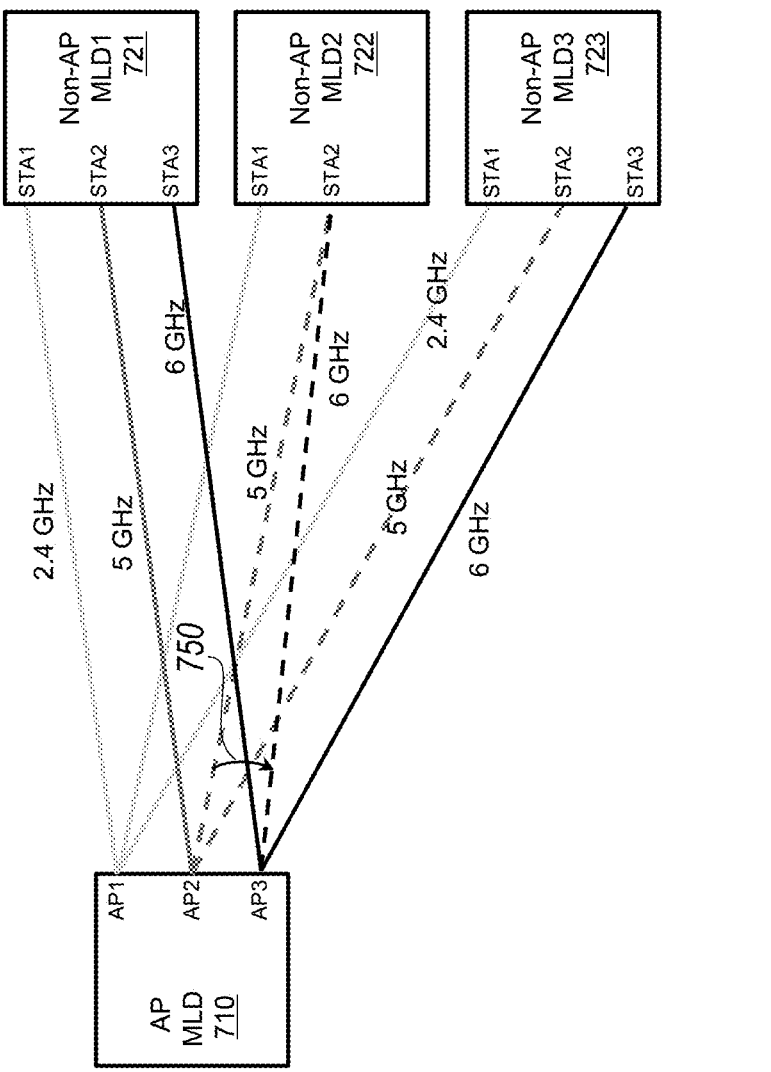
FIG. 7 is a diagram of an example ML reconfiguration scenario according to an example implementation of the present disclosure.

FIG. 7 is a diagram of an example ML reconfiguration scenario according to an example implementation of the present disclosure. In some embodiments, referring to FIG. 7, a ML reconfiguration (e.g., post-association ML configuration) may be performed by changing an AP endpoint of a link from one AP (e.g., AP2 of an AP MLD 710) to another AP (e.g., AP3 of the AP MLD 710). The AP MLD 710 may be associated with 3 MLDs (e.g., non-AP MLD1 721, non-AP MLD2 722, non-AP MLD3 723). For example, MLD1 with 3 STAs is initially on 2.4 GHz, 5 GHz, and 6 GHz. MLD2 with 2 STAs is initially on 2.4 GHz and 5 GHz. MLD3 with 3 STAs is initially on 2.4 GHz, 5 GHz, and 6 GHz. Now, the AP MLD 710 may want or desire or be configured/caused to move MLD2 and MLD3 to operate at 6 GHz (from current 5 GHz) due to congestion or link loss or just traffic engineering at the 5 GHz channel. MLD3 can simply disable/deactivate/remove the 5 GHz link. MLD2, however, may involve a ML reconfiguration. For example, as shown in FIG. 7, AP2 of the AP MLD 710 can perform a ML reconfiguration by changing/switching the AP endpoint of the link (to MLD2) from AP2 to AP3. After performing the ML reconfiguration, MLD1 with 3 STAs is on 2.4 GHz, 5 GHz, and 6 GHz, MLD2 with 2 STAs is on 2.4 GHz and 6 GHz, and MLD3 with 3 STAs is on 2.4 GHz and 6 GHz.

Common scenarios similar to that of FIG. 7 can include a case in which there are fewer non-AP STAs than AP STAs within associated MLDs (no 1:1 mapping). For example, in FIG. 7, STA1 and STA2 of MLD2 (fewer than 3 APs of AP MLD 710) are associated with the AP MLD 710. Another common scenario is that AP STAs within the AP MLD are tied to certain bands or channels (switching constraints, or radio in use) as shown in FIG. 7.

Figure 8:
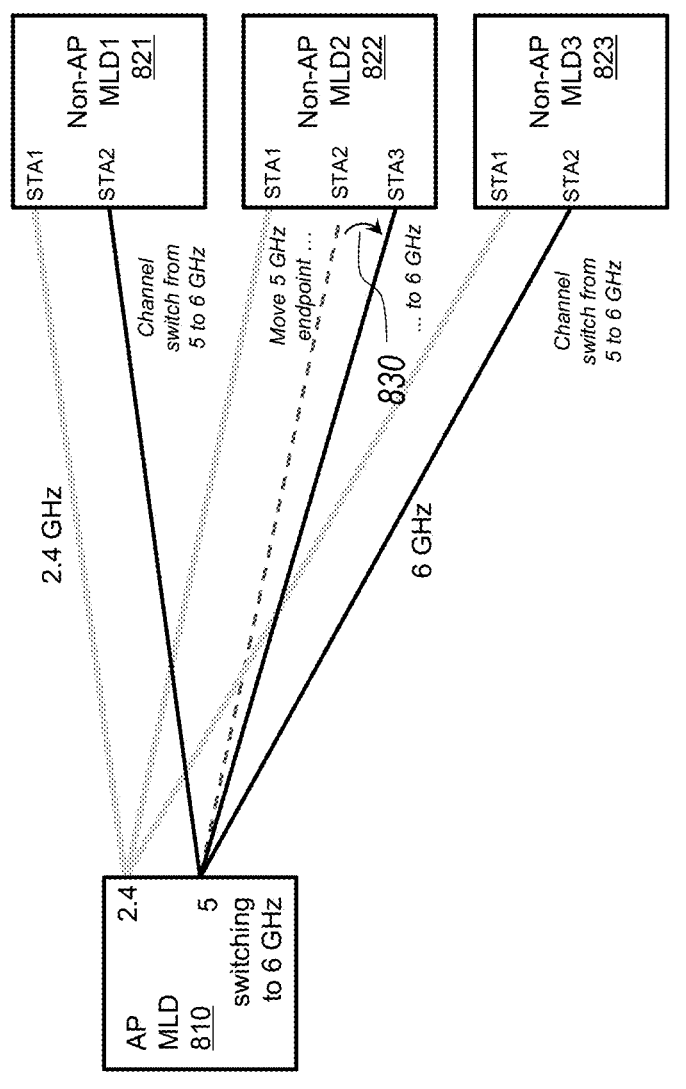
FIG. 8 is a diagram of another example ML reconfiguration scenario according to an example implementation of the present disclosure.

FIG. 8 is a diagram of another example ML reconfiguration scenario according to an example implementation of the present disclosure. In some embodiments, referring to FIG. 8, a ML reconfiguration (e.g., post-association ML configuration) may be performed by changing/transitioning/switching a non-AP endpoint of a link from one STA (e.g., STA2 of an MLD2 822) to another STA (e.g., STA3 of an MLD2 822). The AP MLD 810 may be associated with 3 MLDs (e.g., non-AP MLD1 821, non-AP MLD2 822, non-AP MLD3 823). For example, MLD1 with 2 STAs is initially on 2.4 GHz and 5 GHz. MLD2 with 3 STAs is initially on 2.4 GHz and 5 GHz. For example, assuming that STA2 of MLD2 is only 5 GHz capable and STA3 of MLD2 is only 6 GHz capable, STA1 of MLD2 is on 2.4 GHz and STA2 is on 5 GHz. MLD3 with 2 STAs is initially on 2.4 GHz and 5 GHz. Now, the AP MLD 810 may want or desire or be configured/caused to move all MLDs (MLD1, MLD2 and MLD3) from current 5 GHz to 6 GHz. In other words, AP MLD 810 switching from 5 GHz to 6 GHz may be caused to connect to different non-AP STAs affiliated with non-AP MLDs. In order to handle this change, MLD1 with 2 STAs can cause one of its STAs to perform a channel switch from 5 GHz to 6 GHz. Similarly, MLD3 with 2 STAs can cause one of the STAs to perform a channel switch from 5 GHz to 6 GHz. MLD2, however, may involve/perform a ML reconfiguration. For example, as shown in FIG. 8, MLD2 822 can perform a ML reconfiguration 830 by changing the non-AP endpoint of the link (to AP MLD 810) from STA2 to STA3. In other words, MLD2 822 can set up a new link to the AP MLD 810 on a new STA (STA3). After performing the ML reconfiguration, MLD1 with 2 STAs is on 2.4 GHz and 6 GHz, MLD2 with 3 STAs is on 2.4 GHz and 6 GHz (through a new STA3), and MLD3 with 2 STAs is on 2.4 GHz and 6 GHz.

Common scenarios similar to that of FIG. 8 include a case in which there are fewer AP STAs than non-AP STAs within associated MLDs (no 1:1 mapping). For example, in FIG. 8, two APs of AP MLD 810 (fewer than 3 STAs of non-AP MLD2 822) are associated with the non-AP MLDs (MLD1, MLD2, MLD3). Another common scenario is that non-AP STAs within an non-AP MLD are tied to certain bands or channels (switching constraints, or radio in use). For example, as shown in FIG. 8, STA2 of MLD2 is only 5 GHz capable and STA3 of MLD2 is only 6 GHz capable. In some embodiments, non-AP MLDs may make the (associated) AP MLD aware of all their STAs (STAs of the non-AP MLDs) and their capabilities (capabilities of the non-AP MLDs). For example, as shown in FIG. 8, non-AP MLD2 can make the AP MLD 810 aware of (1) STA1, STA2, STA3 of MLD2 and (2) capabilities (e.g., band/channel capabilities) of STA1, STA2, STA3 of MLD2.

Figures 9A, 9B, 9C:
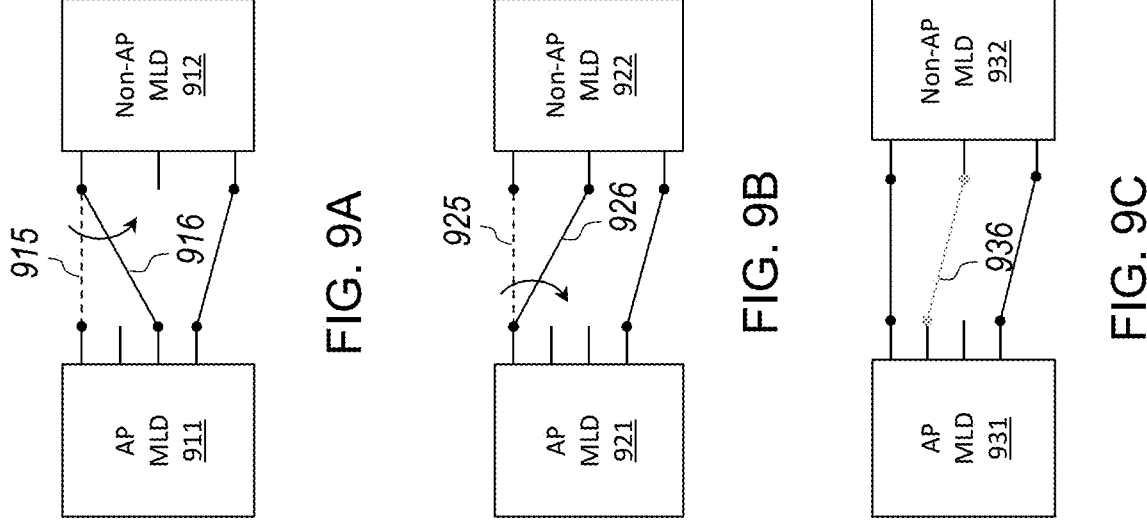
FIG. 9A to FIG. 9C are diagrams of other example ML reconfiguration scenarios according to an example implementation of the present disclosure.

FIG. 9A to FIG. 9C are diagram of other example ML reconfiguration scenarios according to an example implementation of the present disclosure. FIG. 9A shows a ML reconfiguration of changing/switching an AP end of a link. A non-AP MLD 912 may switch the AP end of the link from an AP 915 of the AP MLD 911 to an AP 916 of the AP MLD 911. FIG. 9A shows a ML reconfiguration changing/switching an AP end of a link, performed in a scenario that (1) a non-AP connects to a new AP, (2) there are fewer non-AP STAs than AP STAs within MLDs, or (3) AP STAs have band/channel switching constraints.

FIG. 9B shows a ML reconfiguration of changing/switching a non-AP end of a link. An AP MLD 921 may switch the non-AP end of the link from a STA 925 of the non-AP MLD 922 to a STA 926 of the non-AP MLD 922. FIG. 9B shows a ML reconfiguration of changing/switching a non-AP end of a link, performed in a scenario that (1) an AP connects to a new non-AP, (2) there are fewer affiliated AP STAs than affiliated AP STAs, or (3) affiliated non-AP STAs have band/channel switching constraints.

FIG. 9C shows a ML reconfiguration of adding a new link due to (1) traffic load increase, (2) changes of current channel condition (e.g., range, reachability, etc.), or (3) a new application starting to run, which may use a new radio purposed for the type of the new application (e.g., activating a new 6 GHz radio in response to a virtual reality (VR) application request. A new link 936 may be added by either an AP MLD 931 or a non-AP MLD 932. FIG. 9C shows a ML reconfiguration of adding a new link, performed/implemented in a scenario that such new link has not been set up at an association time.

In some embodiments, ML reconfiguration scenarios may include removing a link. A link can be removed because operating on all available links may not always be the best option due to a variety of reasons. For example, a link can be removed (1) for improved efficiency or power save, (2) for less management overhead, or (3) to stick with a dominant traffic component (e.g., keeping a Traffic ID (TID) with 5% of the traffic together with the only other TID carrying 95%, in one link). In some embodiments, ML reconfiguration scenarios may be dynamic, depending on some factors such as the physical distance and link conditions between a non-AP MLD and an AP MLD (e.g., poor performance on a 6 GHz link but acceptable performance on 2.4 and 5 GHz links). In some embodiments, a ML reconfiguration of removing a link may be performed so that the link is removed permanently from a protocol standpoint.

In some embodiments, switching one end of the link (as shown in FIG. 9A and FIG. 9B) can be performed as a one-step ML reconfiguration. In some embodiments, switching one end of the link (as shown in FIG. 9A and FIG. 9B) can be achieved as for instance a two-step process through a link removal and an addition.

In some embodiments, AP STAs and non-AP STAs can perform signaling for ML reconfiguration. For example, STAs may send or receive three types of messages for ML reconfiguration: (1) ML Reconfiguration Request, (2) ML Reconfiguration Response, and/or (3) ML Reconfiguration Notify (or Notification). Request (ML Reconfiguration Request) may be sent by a non-AP MLD. Response (ML Reconfiguration Response) may be sent by an AP MLD in response to the request. Notify (ML Reconfiguration Notify) may be sent by the AP MLD (unsolicited) to recommend (e.g., propose/offer/implement) changes to configuration (i.e., reconfiguration) to non-AP MLD(s). In some embodiments, all frames may carry a Reconfiguration variant Multi-Link element to indicate configuration (mapping between non-AP and AP endpoints of the MLDs).

Figures 10A, 10B, 10C:
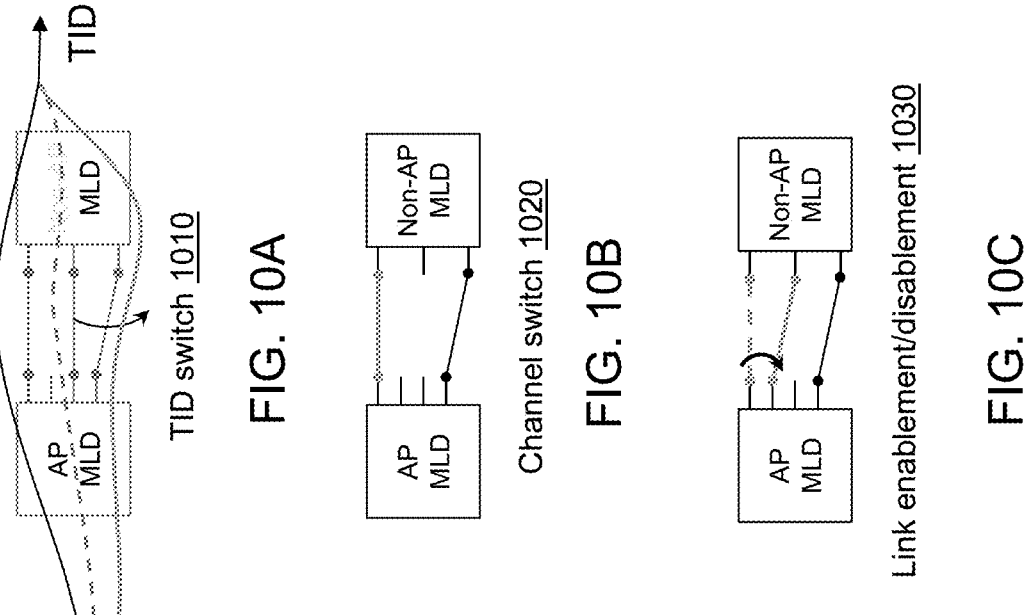
FIG. 10A to FIG. 10C are diagrams of example operations that are not a ML reconfiguration.

FIG. 10A to FIG. 10C are diagrams of example operations that are not a ML reconfiguration. FIG. 10A shows a traffic ID (TID) switch 1010 that performs a change/update of TID-to-link mapping. A TID switch operates such that links remain the same, while mapping between TIDs and links can change (so as to change split between two links). Thus, the operation of a TID switch is not a ML reconfiguration which changes mapping between AP and non-AP STA entities of two associated MLDs.

FIG. 10B shows a channel switch 1020 that performs change of link-to-channel mapping. The operation of a channel switch does not make any changes from a multi-link operation (MLO) perspective. In other words, a channel switch operates such that the same link operates on a different channel. Thus, the operation of a channel switch is not a ML reconfiguration which changes mapping between AP and non-AP STA entities of two associated MLDs.

FIG. 10C shows an operation of link enablement or disablement 1030 that performs change of active links for a variety of reasons (e.g., power save, vacating TIDs). Such link enablement or disablement operates such that link is set up at an association time and the operation of link enablement or disablement does not change mapping of AP STAs and non-AP STAs within two associated MLDs. Thus, the operation of link enablement or disablement is not a ML reconfiguration which changes mapping between AP and non-AP STA entities of two associated MLDs.

In some embodiments, a ML reconfiguration can be a standard part of architecture such that a MLO framework can provide mechanisms to make adjustments post association without having to disassociate. It is noted that the case of non-AP switching to different AP within the MLDs is remotely similar to BSS Transition Management (BTM), which allows AP to instruct client to start roaming, but there is really no network-wide transition in a ML reconfiguration. For example, a BTM-like signaling can be used, but there is no re-association. Assuming that the same PTK (pairwise transient key) is used for all ML links, PTK can stay the same, and new GTK (group temporal key) set up may be performed.

In some embodiments, a ML reconfiguration may be performed generally as a symmetric operation. There may be little difference between AP and non-AP STAs within two associated MLDs in terms of reasons to initiate a link switch. Adding or removing or replacing a link can arise on any side—AP or non-AP. In other words, an ML reconfiguration can be initiated or performed by either side of MLDs, e.g., by an AP MLD or by a non-AP MLD. It is possible that a ML Reconfiguration does not change the (MLD-level) network roles although a ML reconfiguration can be initiated by an AP MLD. A non-AP can trigger the operation (similar to sending a Query frame in BTM).

In some embodiments, an ML reconfiguration can be performed such that traffic loss during the reconfiguration can be minimized, which is a common goal (with potentially common solutions) for all switching scenarios. Traffic loss during the ML reconfiguration can be minimized at TID-level or link-level. In some embodiments, a ML reconfiguration can be performed similar to Fast Session Transfer (FST) or Fast BSS Transition (FT). For example, for data plane ownership during a ML reconfiguration, the ML reconfiguration can be performed to ensure that MAC protocol data units (MPDUs) are received on new link(s) before declaring the operation successful. Although references pertaining to FST (or FT) are provided in this disclosure, these are by way of example and not intended to be limiting in any way. For instance, references to FST can instead apply to FT with suitable adaptations, and vice versa.

In some embodiments, "ghost" links may be created at an association time when the number of affiliated STAs with AP and non-AP MLDs do not match. For example, one possible scenario is that a non-AP MLD has a STA for each AP of an AP MLD known at an association time, and some links go in an indefinite state of power save after association time. This can be a scenario-dependent and/or an implementation choice. Such ghost links can be created or implemented using (1) an additional MAC feature (e.g., introducing additional power save features), (2) extra resources (e.g., unique MAC addresses, link IDs, information blocks in signaling, etc.), and/or (3) faster enablement/disablement aimed at a different time scale. This practice is neither replacing, nor is precluded by, a ML reconfiguration. Such ghost links may not be a substitute for general link addition (when new links are unknown or not set up for any reason at association time), or link removal (permanent in protocol sense), or modifying the link endpoints, or other changes in the AP/non-AP mapping. It is noted that the number of affiliated STAs with AP and non-AP MLDs do not match in some cases, e.g., fewer AP STAs than non-AP STAs within the MLDs. Such ghost links can be implemented as an operation or a configuration.

In some embodiments, MLD-level states may be preserved across a ML reconfiguration. MLD-level states may include power save states, BlockAck operation, TIDs, traffic streams (TSs), traffic categories (TCs), authentication information, GTK, or PTK. In some embodiments, link-level states may be reset for new or modified links. ML reconfiguration is generally not a substitute for frequent switching between two or more links (as in enhanced single radio for example). In some embodiments, MLD-level state preservation across a ML reconfiguration can be performed such that logic can be kept simple and straightforward. For example, TIDs can be mapped to links modified during ML reconfiguration (if those links have not been vacated), and can fall back to TID-to-any link, until possibly mapped again.

In some embodiments, a ML reconfiguration may be performed in a manner similar to that of BSS Transition Management (BTM) in that (1) AP recommends non-AP to transition to a new AP, (2) Query, Request and Response frames are used, and/or (3) a Neighbor Report element is used.

In some embodiments, a ML reconfiguration may be performed in a manner similar to that of Fast Session Transfer (FST) or Fast BSS Transition (FT). FST is designed to transfer a session (defined as one or more traffic streams (TSs)) from one band/channel to another band/channel. Traffic categories (TCs) can also use FST and TS constraint is probably unnecessary. Equivalent of an MLO link may be an independent association between the FST endpoints in each band/channel. For example, the endpoints network roles (e.g., AP or non-AP relationship) can be different in the new band/channel. Operating parameters of each FST association may be generally unavailable across BSSs in the FST framework, which means the parameters can be signaled at transition (through the Multi-band element). Architecturally, it is possible that the two endpoints of an FST session do not manage their multiple MAC sublayers through a multiple MAC station management entity (SME) (MM-SME). FST can switch one TID from one BSS to another BSS between two given multi-band devices. Multi-band definitions are general enough to apply to two channels in the same band.

Figure 11:
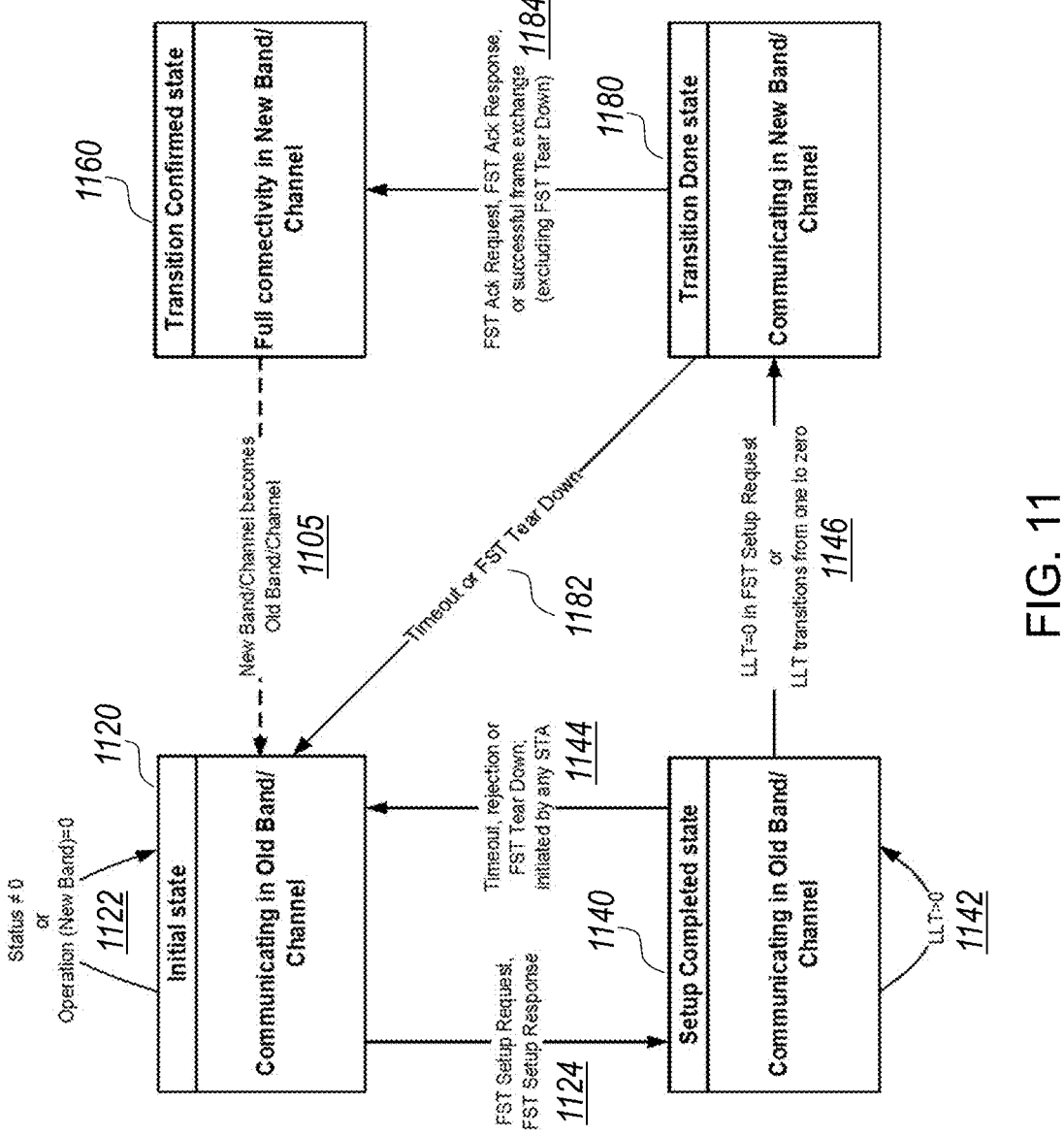
FIG. 11 is a diagram of an example Fast Session Transfer (FST) session transfer protocol according to an example implementation of the present disclosure.

In some embodiments, a ML reconfiguration may be performed using a protocol similar to FST session transfer protocol. FIG. 11 is a diagram of an example FST session transfer protocol according to an example implementation of the present disclosure. In a FST session transfer protocol, session transfer can be initiated by either end (e.g., initiator end and responder end). IN some embodiments, referring to FIG. 11, the FST session transfer protocol may use state machine with four states (Initial state 1120, Setup Completed state 1140, Transition Done state 1180, and Transition Confirmed state 1160). With the four states, the following state transition logic may be performed. In transition logic 1124 from the Initial state to the Setup Completed state, successful exchange of FST Setup Request and FST Setup Response Action Ack frame may be performed with no timeout; retries may be left to the initiator; and MAC address-based arbitration between racing requests may be performed. In transition logic 1146 from the Setup Completed state to the Transition Done state, after a STA-based or stream-based (TS-based) countdown to 0 (logic 1142); a counter is initially loaded to LLT×32 µs, where link loss timeout (LLT) is specified in the FST Setup Request frame; the counter is reset to initial value every time an individually addressed frame for the STA or for the specific TS in the STA is received from the peer STA. In transition logic 1184 from the Transition Done state to the Transition Confirmed state, successful exchange of FST Ack Request and FST Ack Response (both Action Ack frames) or other MPDUs are performed in the new band/channel. In transition logic 1105 from the Transition Confirmed state to the Initial state, a new band or channel becomes an old band or channel. In transition logic 1122 from the Initial state to the Initial state, state is not zero or operation on a new band is not performed. In transition logic 1144 from the Setup Completed state to the Initial state, at least one of timeout, rejection or FST tear down arises; and this transition can be initiated by any STA. In transition logic 1182 from the Transition Done state to the Initial state, either timeout or FST tear down arises.

In some embodiments, a ML reconfiguration may be performed using a new Information Element (IE) variant, referred to as ML Reconfiguration Variant Multi-link IE. In some embodiments, a ML IE may have a type of one of (1) ML Reconfiguration variant (ML Reconfiguration Variant Multi-link IE), (2) Basic variant, or (3) Probe Request variant. The ML-Reconfiguration Variant ML IE may contain Per Link Information field for each STA that the new mapping involves.

In some embodiments, each Per Link-Mapping Information field may include at least Field 1, Field 2, and Field 3. Field 1 (Action field) may contain add, remove, change. Field 2 (AP end point description field; optional) may include (1) Field 2.1: Type=AP, (2) Field 2.2: Link ID: AP's link ID, (3) Field 2.3: MAC address: AP's MAC address, and/or (4) Field 2.4: Description of Capability and operating mode for this AP (optional). Field 3 (Non-AP STA end point description field; optional) may include (1) Field 3.1: Type=Non-AP STA, (2) Field 3.2: Link ID: Link ID of the AP that this non-AP STA is requesting to associate with, (3) Field 3.3: MAC address: the non-AP STA's MAC address, and/or (4) Field 3.4: Description of Capability and operating mode for this non-AP STA (optional).

In some embodiments, in case of (Action field=Add), if transmitted by an AP, Field 2 is present and all subfields are present; Field 3 may be present as recommended STA to associate with the new AP with subfield 3.4 absent. In case of (Action field=Add), if transmitted by a non-AP STA, Field 2 is not present; and Field 3 is present with all its subfields. In case of (Action field=Remove), if transmitted by an AP, Field 2 is present with subfield 2.4 absent; and field 3 is not present. In case of (Action field=Remove), if transmitted by a non-AP STA, Field 2 is absent, field 3 is present with subfield 3.4 absent. In case of (Action field=Change), if transmitted by an AP, Field 2 may present with subfield 2.4 either absent or present; and field 3 is present with subfield 3.4 absent. In case of (Action field=Change), if transmitted by a non-AP STA, Field 2 is absent, Field 3 is present with subfield 3.4 present.

FIG. 12 is a diagram showing example protected Extremely High Throughput (EHT) Action field values (which define frame types) and an example frame or field structure of ML Reconfiguration Request and Response, according to an example implementation of the present disclosure.

In some embodiments, protected EHT Action field frames may indicate ML Reconfiguration Request and Respond frames, by defining new values in protected EHT Action field values. For example, referring to FIG. 12, a table 1210 defines meaning and time priority of protected EHT Action field values. A portion 1212 of the table 1210 is already defined in the 802.11be standard, while a portion 1214 defines new protected EHT Action field values 6 and 7 for ML Reconfiguration Request and Respond frames so that both frames can carry ML Reconfiguration Variant ML IE. If a protected EHT Action field value is 6 or 7, a ML Reconfiguration Request Frame or a ML Reconfiguration Response Frame which has a frame structure shown in a table 1220 may be used.

FIG. 13 is a diagram showing example Fast Transition (FT) Action field values (which define frame types) and an example frame or field structure of ML Reconfiguration Request and Response, according to an example implementation of the present disclosure. A table 1310 defines new FT Action field values 6 and 7 for ML Reconfiguration Request and Respond frames so that both frames can carry ML Reconfiguration Variant ML IE. If a FT Action field value is 6 or 7, a ML Reconfiguration Request Frame or a ML Reconfiguration Response Frame which has a frame structure shown in a table 1320 may be used.

Figures 14A, 14B:
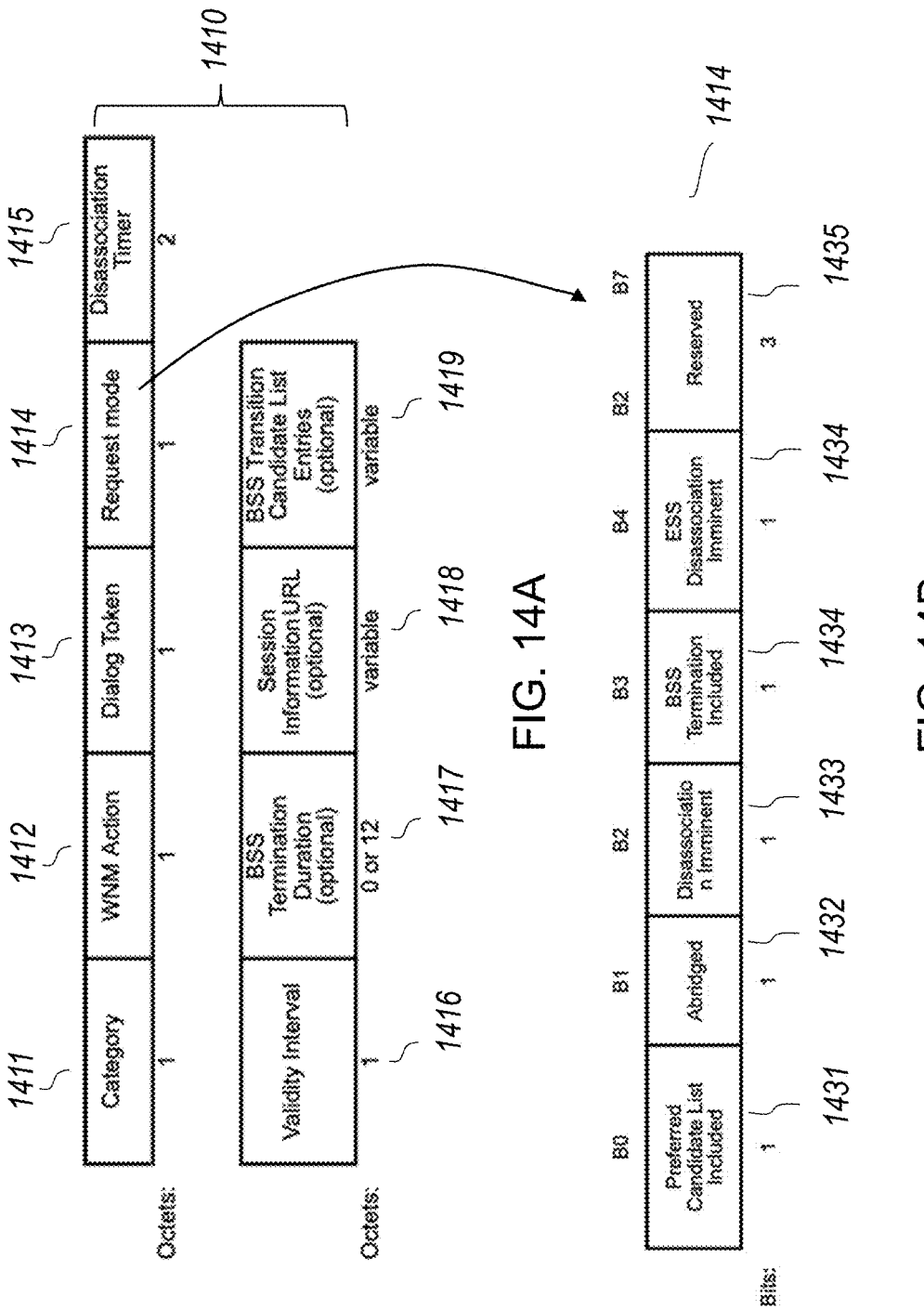
FIG. 14A and FIG. 14B are diagrams of an example frame or field structure of BSS Transition Management Request frame Action field, according to an example implementation of the present disclosure.

FIG. 14A and FIG. 14B are diagrams of an example frame or field structure of BSS Transition Management Request frame Action field, according to an example implementation of the present disclosure. In some embodiments, three existing BSS Transition management frames may be extended to perform the ML reconfiguration functionality. For example, a format of BSS Transition Management Request frame format 1410 as shown in FIG. 14A may be used to perform the ML reconfiguration functionality. The BSS Transition Management Request frame format 1410 includes fields of category 1411, WNM Action 1412, Dialog Token 1413, Request mode 1414, Disassociation Timer 1415, Validity Interval 1416, BSS Termination Duration (optional) 1417, Session Information URL 1418, and BSS Transition Candidate List Entries (optional) 1419.

In some embodiments, the field of Request mode 1414 may have a format shown in FIG. 14B. The format of the field of Request mode 1414 may include subfields of Preferred Candidate List Included 1431, Abridged 1432, Disassociation Imminent 1433, BSS Termination Included 1434, ESS Disassociation Imminent 1434, and Reserved 1435. In some embodiments, any of bits B2 to B7 of Reserved 1435 may be defined as or indicative of <ML Reconfiguration> to indicate that this Request is for ML Reconfiguration. When the bit <ML Reconfiguration> is set, the BSS in the other fields in this frame (e.g., BSS Transition Candidate List Entries 1419) may refer to the AP(s) affiliated with the AP MLD. The BSS Transition Candidate List Entries 1419 may provide information of (new) AP(s) targeted by the transmitting non-AP EHT STA.

Figure 15:
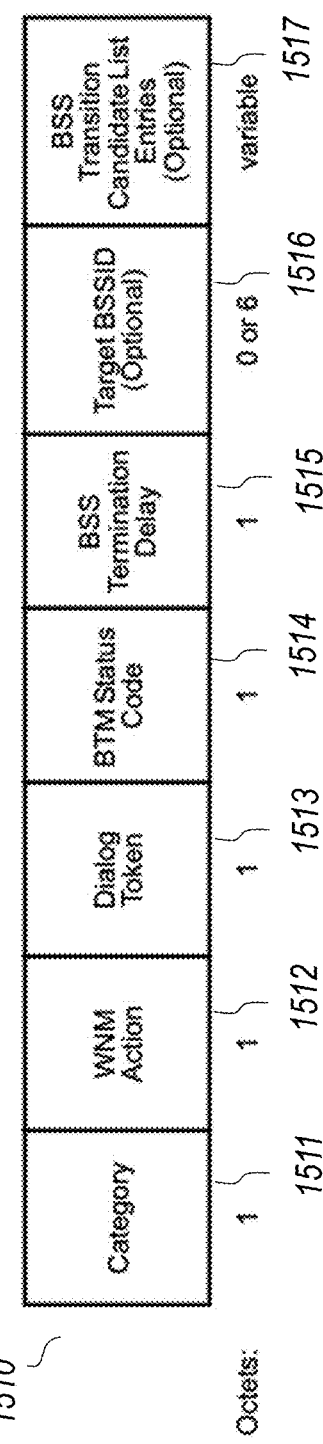
FIG. 15 is a diagram of an example frame or field structure of BSS Transition Management Response frame Action field, according to an example implementation of the present disclosure.

In some embodiments, the BSS Transition Candidate List Entries 1419 may define (e.g., indicate/identify/specify) zero or more Neighbor Report elements. In some embodiments, the BSS Transition Candidate List Entries 1419 may define zero or more (1) Neighbor Report elements or (2) Reduced Neighbor Report elements or (3) Basic Variant Multi-Link elements.

present disclosure. For example, a format of BSS Transition Management Response frame format 1510 as shown in FIG. 15 may be used to perform the ML reconfiguration functionality. The BSS Transition Management Response frame format 1510 includes fields of category 1511, WNM Action 1512, Dialog Token 1513, BTM Status Code 1514, BSS Termination Delay 1515, Target BSSID (optional) 1516, and BSS Transition Candidate List Entries (optional) 1517. When this frame is used to respond to a BSS Transition Management Request frame purposed for ML Reconfiguration (e.g., when the new <ML Reconfiguration> bit in the Request Mode field 1414 is set to 1), the Target BSSID field 1516 may be set to the MAC address of the targeted AP's MAC address; and BSS in the subfields may be interpreted as AP affiliated with the AP MLD. The BSS Transition Candidate List Entries 1517 may have the same information as the BSS Transition Candidate List Entries 1419. That is, the BSS Transition Candidate List Entries 1517 may provide information of (new) AP(s) targeted by the transmitting non-AP EHT STA.

Figures 16A, 16B, 16C:
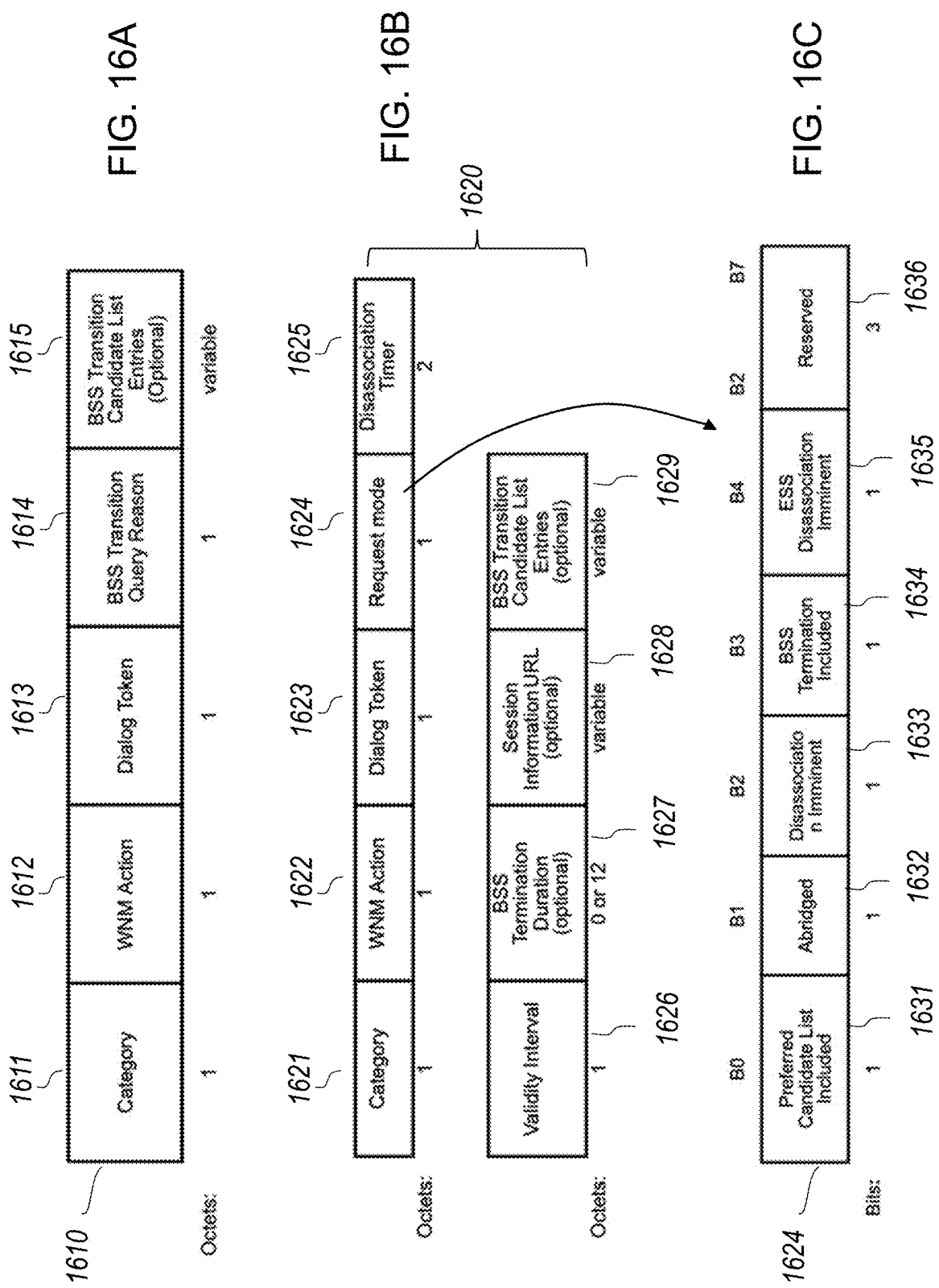
FIG. 16A to FIG. 16C are diagrams of an example frame or field structure of BSS Transition Management Query frame Action field, BSS Transition Management Request frame Action field, and Request mode field.

FIG. 16A to FIG. 16C are diagrams of an example frame or field structure of BSS Transition Management Query frame Action field, BSS Transition Management Request frame Action field, and Request mode field. In some embodiments, a BSS Transition Management Query frame Action field format 1610 may include fields of category 1611, WNM Action 1612, Dialog Token 1613, BSS Transition Query Reason 1614, and BSS Transition Candidate List Entries (optional) 1615. In some embodiments, a BSS Transition Management Request frame Action field format 1620 may include fields of category 1621, WNM Action 1622, Dialog Token 1623, Request mode 1614, Disassociation Timer 1625, Validity Interval 1626, BSS Termination Duration 1627, Session Information URL (optional) 1628, and BSS Transition Candidate List Entries (optional) 1629. In some embodiments, the Request mode 1614 may include subfields of Preferred Candidate List Included 1631, Abridged 1632, Disassociation Imminent 1633, BSS Termination Included 1634, ESS Disassociation Imminent 1635, and Reserved 1636.

In some embodiments, multi-link (ML) reconfiguration function may be defined as a set of procedures to make changes to the connected AP and non-AP mapping (the "ML configuration") within two associated MLDs, without disassociation. Here, a ML configuration is defined as mapping (or connection) between connected AP and non-AP STAs affiliated with two associated MLDs.

In some embodiments, new status codes as shown in Table 1 are added to existing status codes for ML reconfiguration.

TABLE 1

| New Status codes | | |
| --- | --- | --- |
| Status code | Name | Meaning |
| New Status Code 1 | DENIED_ML_CONFIGURATION | Request denied because the requested ML configuration is unacceptable. |
| New Status Code 1 | PREFERRED_ML_CONFIGURATION_SUGGESTED | Preferred ML configuration suggested. |

FIG. 15 is a diagram of an example frame or field structure of BSS Transition Management Response frame Action field, according to an example implementation of the present disclosure.

In some embodiments, new category values as shown in Table 2 are added to existing category values for ML reconfiguration.

TABLE 2

| | | | | Group addressed privacy |
|---|---|---|---|---|
| Code | Meaning | Information Details | Robust | |
| New Category Code 1 | NSEP Priority Service | NSEP Priority Access Action frame details | Yes | No |
| New Category Code 2 | EHT | EHT Action frame details | Yes | No |
| New Category Code 3 | ML | Multi-link Action frame details | Yes | No |

Figures 17A, 17B:
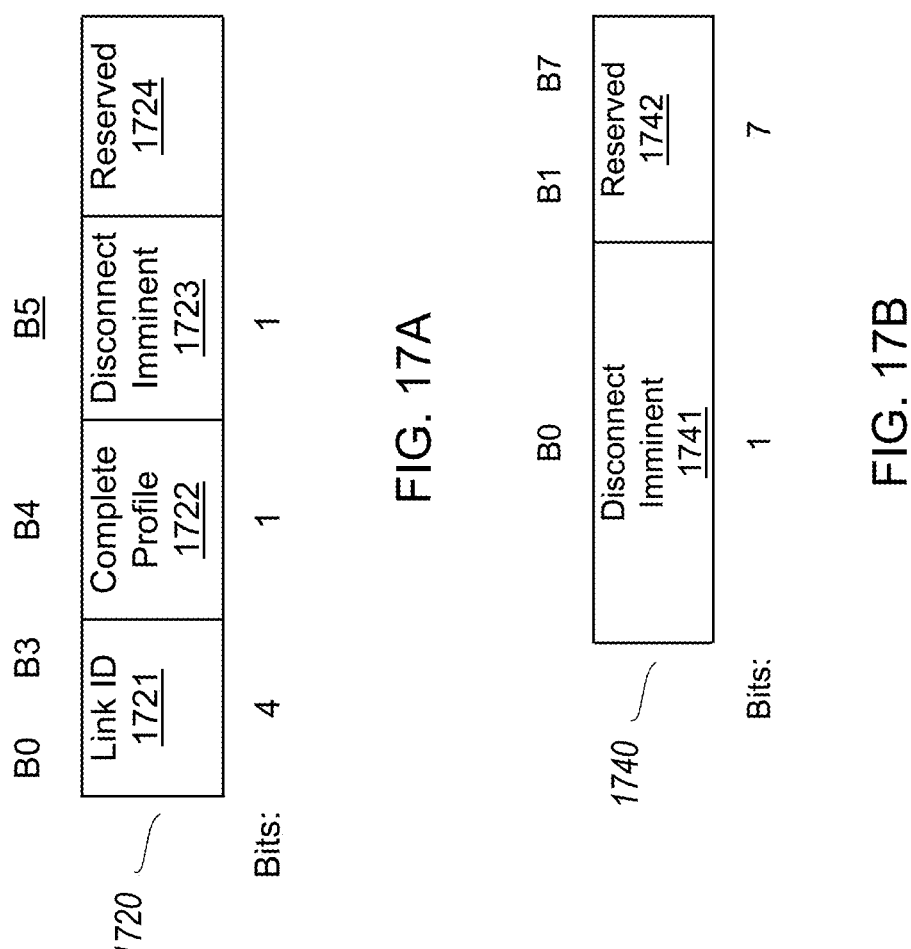
FIG. 17A and FIG. 17B are diagrams of example frames or field structure of a multi-link (ML) element according to an example implementation of the present disclosure.

FIG. 17A and FIG. 17B are diagrams of example frames or field structure of a multi-link (ML) element according to an example implementation of the present disclosure. FIG. 17A is a diagram of an example frame or field structure of Per-STA Control field according to an example implementation of the present disclosure. In some embodiments, referring to FIG. 17A, Per-STA Control field 1720 as a sub-element of an ML element may include subfields of Link ID 1721, Complete Profile 1722, Disconnect Imminent 1723, and Reserved 1724. The Link ID subfield 1721 may specify a value that uniquely identifies the link where the listed STA is operating on or is intended to operate on. In some embodiments, the Link ID subfield may indicate "AP ID" because it defines the broadcast/BSS side of the operation. The Complete Profile subfield 1722 may be set to 1 when the Per-STA Profile sub-element of the ML element is complete; otherwise the subfield may be set to 0. The Disconnect Imminent subfield 1723 may be set to 1 when the Basic variant ML element is carried in an ML Configuration Notify frame, and the transmitting AP MLD intends to disconnect the corresponding STA of a non-AP MLD from its AP that the STA is connected to at the time of sending the frame; otherwise, the STA is set to 0.

In some embodiments, ML Action field values as shown in Table 3 are defined for ML reconfiguration. An ML Action field, in the octet immediately after the Category field, may differentiate the ML Action frame formats. The ML Action field values associated with each frame format within the ML category may be defined in Table 3.

TABLE 3

ML Action field values

| Value | Meaning |
|---|---|
| 0 | ML Configuration Notify or Trigger |
| 1 | ML Configuration Request |
| 2 | ML Configuration Response |
| 3 | TID-to-link mapping Request |
| 4 | TID-to-link mapping Response |
| 5 | TID-to-link mapping Teardown |
| 5-255 | Reserved |

As shown in Table 3, value 0 may indicate ML Configuration Notify. In some embodiments, value 0 may indicate ML Configuration Trigger. Values 3-5 may indicate TID-to-link Action values moved to ML category. In some embodiments, Table 3 may include a value indicative of: adding the link, removing the link or switching one end of the link, between the first wireless MLD and the second wireless MLD (not shown).

In some embodiments, ML Configuration Notify frame format as shown in Table 4 are defined for ML reconfiguration.

TABLE 4

ML Configuration Notify frame Action field format

| Order | Information |
|---|---|
| 1 | Category |
| 2 | ML Action |
| 3 | Request Mode |
| 4 | Disconnect Timer |
| 5 | Multi-link Element |

The Category field (field 1) may be defined in Table 2. The ML Action field (field 2) may be defined in Table 3.

The ML Action field (field 2 of Table 4) is not Dialog Token. Notify is decoupled from the potential follow on Request/Response as non-AP MLD may ignore the notify message, and also may send a Request without it.

FIG. 17B is a diagram of an example frame or field structure of a Request Mode field (field 3 of Table 4) according to an example implementation of the present disclosure. A Request Mode field 1740 may include subfields of Disconnect Imminent 1741 and Reserved 1742. The Disconnect Imminent subfield 1741 may for instance be set to 1 if at least one of the non-AP STAs affiliated with the non-AP MLD receiving the frame will be disconnected some time after transmitting the frame.

The Disconnect Timer field (field 4 of Table 4) may for instance be 2 octets long, and may be present only if the Disconnect Imminent subfield 1741 is nonzero. The Disconnect Timer field may indicate the number of target beacon transmission times (TBTTs) of the AP STA transmitting the frame before the one or more non-AP STAs get disconnected from the AP STAs they are connected to at the time of transmitting this frame. The Disconnect Timer field here is similar in concept to BTM Disassociation Timer.

There are a few options/approaches to define a "time-in-future" behavior for multiple APs in the MLD. In some embodiments, as a mechanical extension of BTM concepts, one timer per AP (per AP that is disconnecting a non-AP, not all APs) can be defined as a multiple of busy-idle (BI) for each AP (different APs run different BIs in general). In some embodiments, the Disconnect Timer may be a single unified timer with absolute time relative to the last TBTT of the link over which this frame is transmitted. The common "disconnect" time is simple, and is justified because these APs are running under common management (there is a unified purpose behind their decisions to disconnect certain non-APs in a non-AP MLD). The common disconnect time, however, will not be necessarily aligned with TBTTs on all links. The common disconnect time for signaling, except that the actual disconnect time on each link will be the first TBTT after the designated time, is defined as opposed to the exact designated time. For example, the common disconnect time for signaling may be potentially different on each link, but not earlier than the designated time, and aligned with TBTT on each link.

In some embodiments, ML Configuration Request frame Action field format as shown in Table 5 is defined for ML reconfiguration.

TABLE 5

| ML Configuration Request frame Action field format | |
| --- | --- |
| Order | Information |
| 1 | Category |
| 2 | ML Action |
| 3 | Dialog Token |
| 4 | Multi-link element |

The Category field (field 1) may be defined in Table 2. The ML Action field (field 2) may be defined in Table 3. The Dialog Token field (field 3) may be set to a nonzero value chosen by the MLD sending the reconfiguration request to identify a transaction. The Multi-link element field (field 4) may be defined in FIG. 17A.

In some embodiments, ML Configuration Response frame Action field format as shown in Table 6 is defined for ML reconfiguration.

TABLE 6

| ML Configuration Response frame Action field format | |
| --- | --- |
| Order | Information |
| 1 | Category |
| 2 | ML Action |
| 3 | Dialog Token |
| 4 | Status Code |
| 5 | Multi-link (optional) |

The Category field (field 1) may be defined in Table 2. The ML Action field (field 2) may be defined in Table 3. The Dialog Token field (field 3) may be set to the value of the Dialog Token field in the corresponding ML Configuration Request frame. The Status Code (field 4) may be defined in Table 1. The Multi-link element field (field 5) may be defined in FIG. 17A.

Figure 18A:
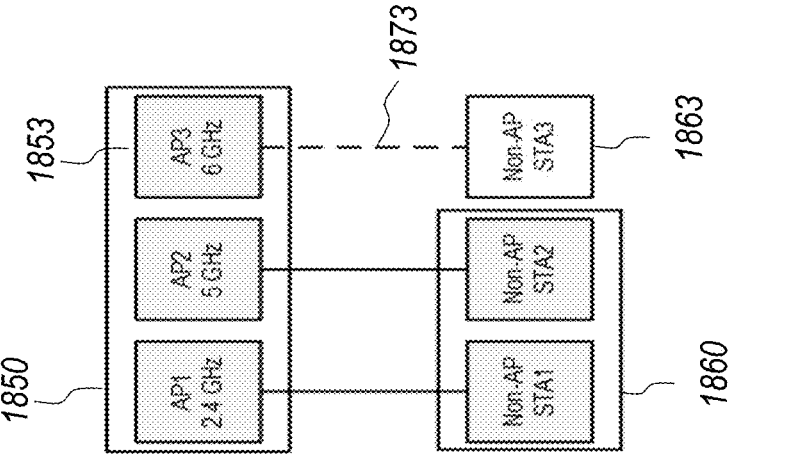
FIG. 18A and FIG. 18B are diagrams of example ML reconfigurations according to an example implementation of the present disclosure.
Figure 18B:
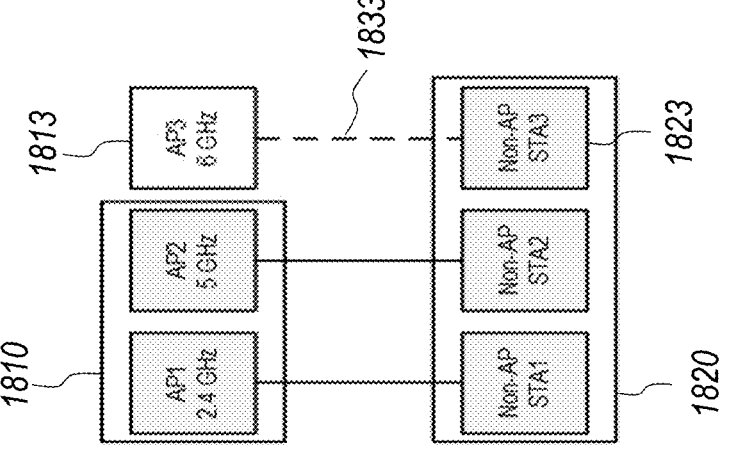

FIG. 18A and FIG. 18B are diagrams of example ML reconfigurations according to an example implementation of the present disclosure. Multi-link reconfiguration (ML reconfiguration, or reconfiguration for short) refers to a set of procedures to make changes to a multi-link (ML) configuration. The ML configuration is defined as mapping or connection between connected AP and non-AP STAs affiliated with their respective associated MLDs (which are already associated).

FIG. 18A and FIG. 18B illustrate two example reconfiguration scenarios. In FIG. 18A, an AP MLD 1810 may make a new AP STA 1813 (which operates at 6 GHz) available to its multi-link operation. For example, the AP MLD 1810 may advertise the new AP STA 1813 to an associated non-AP MLD 1820 or all non-AP MLDs it is associated with. Associated non-AP MLDs (e.g., MLD 1820), having discovered the new AP STA 1813 (through a recent beacon transmission for example), can request the AP MLD 1810 for a new link 1833 to the new AP STA 1813, without disassociation (e.g., operation on the other two links is unaffected).

In FIG. 18B, a non-AP MLD 1860 may add/activate a new non-AP STA 1863 (which can operate at 6 GHz, for example) to its multi-link operation, and request an AP MLD it is associated with for a new link 1873 to an available AP STA 1853 affiliated with the AP MLD 1850, while staying in the associated state. For example, the non-AP MLD 1860 may communicate availability of the new non-AP STA 1863 to the AP MLD 1850, and request to add the new non-AP STA 1863 without disassociation (e.g., operation on the other two links is unaffected).

In some embodiments, a ML reconfiguration operation may include certain discovery procedures through which AP and non-AP MLDs announcing changes to their affiliated STAs. These changes may be announced to one or more associated MLDs in a restrictive manner, or publicly to all associated and unassociated STAs, depending on the intent.

In some embodiments, ML reconfiguration procedures may add links to, or remove links from, a link set in use by two associated MLDs. The procedure of adding or removing a link may be in the form of a request/response exchange initiated by a non-AP MLD; however, an AP MLD may trigger a non-AP MLD to make a reconfiguration request.

In the following section, a basic non-AP initiated reconfiguration procedure is described.

A non-AP MLD in associated state may attempt to modify an ML configuration established at an association time by sending an ML Configuration Request frame (see Table 5) to an AP MLD it is associated with. The ML Configuration Request frame may contain a Basic variant Multi-link (ML) element that includes one or more STA profile sub-element (s), each of which corresponding to a STA of the non-AP MLD intends to connect to a different AP STA, or to disconnect. Compared to the Basic variant ML element carried in an Association Request frame or a Re-Association Request frame, the Basic variant ML element in the ML Configuration Request frame may include the STA profile sub-elements corresponding to non-AP STAs that are introduced to or discovered by the AP MLD for the first time and/or are intended to connect to a different AP STA or disconnect from an AP STA. For example, the STA profile sub-elements may correspond to STAs that have not been present in the (Re-) Association Request frame or prior transmissions of the ML Configuration Request frame. In some embodiments, the STA profile sub-element for STAs that are known to the AP may exclude STA information such as its capabilities.

In response to an ML Configuration Request frame, an AP MLD may transmit an ML Configuration Response frame (see Table 6) to the non-AP MLD that indicates acceptance or rejection of the request. The AP MLD may set the Status Code field in the ML Configuration Response frame to SUCCESS if it has accepted the request. Otherwise, the AP MLD may set the Status Code field in the ML Configuration Response frame to REFUSED or REJECTED or DENIED if it has not accepted the request and is not suggesting an alternative ML configuration. The AP MLD may set the Status Code field in the ML Configuration Response frame to REJECTED_WITH_SUGGESTED_CHANGES if it has not accepted the request but is including a suggested alternative ML configuration (as a second request) in its response. In the last case, the AP MLD may include in its response a Basic variant ML element that defines an acceptable ML configuration resulting from a requested reconfiguration.

In some embodiments, while the ML Configuration Request frame includes only the intended changes to ML configuration, an ML Configuration Response frame (see Table 6) that indicates rejection of the request and suggests an alternative configuration may include a complete list of connected non-AP and AP STAs that the AP MLD expects in the ML configuration.

In the following section, an AP-triggered reconfiguration procedure is described.

In some embodiments, an AP MLD may trigger a ML reconfiguration by sending an ML Configuration Notify frame (or ML Configuration Trigger frame; notify frame or trigger frame for short) to an associated non-AP MLD. Referring to Table 4, the notify frame may contain a Basic variant ML element (e.g., field 5 of Table 4) that includes STA profile sub-element for all non-AP STAs that (1) are connected at the time of sending the notify frame, or (2) the AP is recommending to be connected to, or (3) the AP is recommending to disconnect.

In some embodiments, in response to receiving the ML Configuration Notify frame, the non-AP MLD may modify (e.g., update/change/adjust) the recommendation and can generate/provide a modified recommendation, and can send a second request (e.g., ML Configuration Request frame in Table 5) including the modified recommendation to the AP MLD. The request may include a second variant ML reconfiguration IE (e.g., field 4 of Table 5) indicating the modified recommendation. In some embodiments, in response to receiving the second request, the AP MLD may determine/decide whether the second request is accepted or rejected, and can send a second response (e.g., ML Configuration Respond frame in Table 6) including a result of the determination to the non-AP MLD. The response may include a third variant ML reconfiguration IE (e.g., field 5 of Table 6) indicating the result of the determination whether the second request is accepted or rejected. In some embodiments, the third variant ML reconfiguration IE may include/indicate/provide a new configuration unilaterally decided by the AP MLD.

In some embodiments, referring to FIG. 17A, for each non-AP STA corresponding to a STA profile sub-element in the ML element, the AP MLD may set Link ID subfield (e.g., Link ID subfield 1721) and Disconnect Imminent subfield (e.g., Disconnect Imminent subfield 1723) in the corresponding Per-STA Control field (e.g., Per-STA Control field 1720). In some embodiments, the Link ID subfield may designate/identify/specify the AP that the AP MLD is recommending the non-AP STA to connect to, or may be set to <To Be Defined> if the AP MLD is recommending the non-AP STA to disconnect. In some embodiments, the Disconnect Imminent subfield may be set to 1 if the AP MLD will be disconnecting the non-AP STA, and may be set to 0 otherwise. The Disconnect Imminent subfield in the Request Mode field in the notify frame may be set to 1 if the AP MLD will be disconnecting at least one non-AP STA (e.g., the Disconnect Imminent subfield in at least one STA profile sub-element is set to 1), and may be set to 0 otherwise.

In some embodiments, a Disconnect Timer field (e.g., field 3 of Table 4) may be 2 octets long, and may only be present if the Disconnect Imminent subfield is nonzero. The Disconnect Timer field may indicate the number of target beacon transmission times (TBTTs) of the AP STA transmitting the frame before one or more non-AP STAs get disconnected (if they are still connected) from the AP STAs they are connected to at the time of transmitting the notify frame. To determine whether the frame is transmitted before one or more non-AP STAs get disconnected, a single timer may be used. In some embodiments, after one or more non-AP STAs get disconnected, the disconnect time may be aligned on each link with the next TBTT of that link, if architecturally needed (e.g., ensuring that non-AP STAs in power save (and normally tuned to their own DTIM beacons) get any last moment message, although in this case there is no Disassociation sent). Overall, this time may be more of a deadline before which "warned" non-APs are expected to have moved on to other links, or if still there, are meant to be disconnected. In other words, a non-AP MLD can let connections progress as AP indicated, without extra effort.

In response to an ML Configuration Notify frame, a non-AP MLD may initiate reconfiguration following the procedure described above. In some embodiments, the non-AP MLD may initiate reconfiguration such that the ML configuration requested in the ML Configuration Request frame do not conflict with the configuration suggested in the notify frame. For example, assuming that there are MLDs each with 3 STAs and two links at 2.4 and 5 GHz, in a first example scenario, AP MLD triggering reconfiguration may be performed by recommending to delete the 5 GHz link and add a 6 GHz link. A ML Configuration Notify frame for deleting the 5 GHz link may include a Disconnect Imminent subfield. A Non-AP MLD may sends a ML Configuration Request frame to add a 6 GHz link and remove the 5 GHz link, and the AP MLD may accept/adopt the request. A second example scenario is similar, except there is no disconnect imminent. For example, a non-AP MLD may keep the 5 GHz link and request to add a 6 GHz link (operating with 3 links now) and an AP MLD may accept the request.

In some embodiments, the AP MLD may advertise the ML element in beacons, e.g., add new AP information in the Beacons and flag critical update (or not).

In some embodiments, there may be two cases for an AP MLD initiating a reconfiguration: (1) the AP MLD initiates a unicast add-link operation with a non-AP MLD; and (2) the AP MLD announces a new link and ready for a non-AP MLD to initiate a new connection request. The second case is described above. In the first case, in some embodiments, the AP MLD may initiate a unicast add-link operation without exchanging ML Configuration frames (e.g., Notify, Request, Respond).

In the following section, a procedure to make changes to multi-link operations after reconfiguration, is described.

In some embodiments, there are no changes to the operation of a link that is not added or deleted during ML reconfiguration. This may include no changes to security keys, power save operation, established Target wake times (TWTs), and the list of TIDs mapped to the link. In some embodiments, a TID that is mapped to all links can be transmitted over any new link that has been set up after reconfiguration. A TID that is mapped to a set of links that are entirely deleted after reconfiguration may be halted, for example, there is no transmission of MPDUs with that TID until it is mapped to existing links. In some embodiments, instead of halting the transmission, after the removal of all the link where the TID is mapped to, transmission may be performed using default mapping, for example, TID to all link mapping. In some embodiments, an AP MLD or a non-AP MLD may initiate (re)negotiation for TID-to-link mapping upon any changes in the set of the links (e.g., add or removal) after the ML configuration. In some embodiments, to maintain TID operation continuity under reconfiguration, TIDs may be can steered away from any affected link before they are deleted.

FIG. 19 is a flowchart showing a process 1900 of performing a ML reconfiguration, according to an example implementation of the present disclosure. In some embodiments, the process 1900 is performed by an MLD (e.g., AP MLD 401, Non-AP MLD 402 in FIG. 4). In some embodiments, the process 1900 is performed by other entities (e.g., Console 110, HWD 150 in FIG. 1). In some embodiments, the process 1000 includes more, fewer, or different steps than shown in FIG. 19.

In one approach, a first wireless multilink device (MLD; e.g., Non-AP MLD 402 in FIG. 4) sends/transmits 1902 to a second wireless MLD (e.g., AP MLD 401 in FIG. 4), a request for multi-link reconfiguration (e.g., ML Configuration Request frame in Table 5). In some embodiments, the first wireless MLD may be an access point (AP) MLD (e.g., AP MLD 401 in FIG. 4), and the second wireless MLD may be a non-AP MLD (e.g., Non-AP MLD 402 in FIG. 4), or the first wireless MLD may be a non-AP MLD (e.g., Non-AP MLD 402 in FIG. 4), and the second wireless MLD may be an AP MLD (e.g., AP MLD 401 in FIG. 4).

In some embodiments, the request may include an ML reconfiguration message (e.g., ML Configuration Request frame in Table 5). The request may include a ML reconfiguration information element (IE; e.g., ML element 600 in FIG. 6, Per-STA Control field 1720 in FIG. 17A), the ML reconfiguration IE including a link-mapping information field for the AP STA or the non-AP STA (e.g., Per-STA Profile 620 in FIG. 6, or Per-STA Control field 1720 in FIG. 17A). In some embodiments, the ML reconfiguration IE may be a variant ML reconfiguration IE. In some embodiments, the link-mapping information field may be a per link information field (e.g., Link ID 652, Complete Profile 654 in FIG. 6, Link ID 1721 in FIG. 17A) for each STA that a new mapping involves. The link-mapping information field may include at least one of: an action field (e.g., ML Action field values in Table 3), an AP end point description, or a non-AP STA end point description (e.g., Link ID 652, Link ID 1721 in FIG. 17A).

In one approach, the first wireless MLD receives 1904 from the second wireless MLD, a response (e.g., ML Configuration Response frame in Table 6) to the request for the multi-link reconfiguration. The multi-link reconfiguration may include configuring to implement/support/perform at least one of: adding a link (e.g., FIG. 9C), removing a link or switching one end of a link (e.g., FIG. 9A and FIG. 9B), between the first wireless MLD and the second wireless MLD. The first wireless MLD and the second wireless MLD may maintain connection (e.g., to support or enable traffic or communication) via at least one link during the multi-link reconfiguration.

In some embodiments, the link may be between an AP station (STA) of the AP MLD and a non-AP STA of the non-AP MLD (e.g., links 916, 926, 936 in FIG. 9A to FIG. 9C). The action field (e.g., ML Action field values in Table 3) may include/carry/hold a value indicative of: adding the link, removing the link or switching one end of the link, between the first wireless MLD and the second wireless MLD (e.g., ML Action field values indicating link add/ remove/switch (not shown in Table 3)).

In some embodiments, the first wireless MLD may send a notification (e.g., ML Configuration Notify frame in Table 4) including a first recommendation (e.g., ML element 600, ML element 1720 in FIG. 17A) to the second wireless MLD. The notification may include a first variant ML reconfiguration IE indicating the first recommendation (e.g., ML element in Table 4). The first wireless MLD sending the notification to the second wireless MLD may be an AP MLD and the second wireless MLD may be a non-AP MLD.

In some embodiments, in response to receiving the notification, the second wireless MLD may modify (e.g., adjust/ change) the first recommendation and generate a modified first recommendation, and can send a second request including the modified first recommendation to the first wireless MLD. In some embodiments, in response to receiving the second request, the first wireless MLD may determine/ decide whether the second request is accepted or rejected, and can send a second response including a result of the determination to the second wireless MLD. The request may include a second variant ML reconfiguration IE indicating the modified first recommendation. The response may include a third variant ML reconfiguration IE indicating the result of the determination whether the second request is accepted or rejected. In some embodiments, the third variant ML reconfiguration IE may include/incorporate/specify a new configuration unilaterally decided by the first wireless MLD.

For example, in response to receiving the ML Configuration Notify frame (e.g., Table 4), the non-AP MLD may modify/update the recommendation and can provide/generate a modified recommendation, and can send a second request (e.g., ML Configuration Request frame in Table 5) including the modified recommendation to the AP MLD. The request may include a second variant ML reconfiguration IE (e.g., field 4 of Table 5) indicating the modified recommendation. In some embodiments, in response to receiving the second request, the AP MLD may determine whether the second request is accepted or rejected, and send a second response (e.g., ML Configuration Respond frame in Table 6) including a result of the determination to the non-AP MLD. The response may include/incorporate/ specify a third variant ML reconfiguration IE (e.g., field 5 of Table 6) indicating the result of the determination whether the second request is accepted or rejected. In some embodiments, the third variant ML reconfiguration IE may include/ incorporate/specify a new configuration unilaterally decided/selected/configured by the AP MLD. In some embodiments, the request and the response each may include an enhanced trigger (EHT) action frame (e.g., table 1210 in FIG. 12) and a fast transition action frame (e.g., table 1310 in FIG. 13).

In some embodiments, the request may include a basic service set (BSS) transition management request frame (e.g., BSS Transition Management Request frame format 1410 in FIG. 14A) including at least one of: an indication that the request is for multi-link configuration (e.g., Request mode 1414 in FIG. 14A and FIG. 14B), or a BSS transition candidate list entries field (e.g., BSS Transition Candidate List Entries 1419 in FIG. 14A) that indicates/identifies/ carries/specifies zero or more of: neighbor report elements, reduced neighbor report elements or basic variant multi-link elements.

In some embodiments, the response may include a basic service set (BSS) transition management response frame (e.g., BSS Transition Management Response frame format 1510 in FIG. 15) including a BSS transition candidate list entries field (e.g., BSS Transition Candidate List Entries 1517 in FIG. 15) that indicates/identifies/carries/specifies zero or more of: neighbor report elements, reduced neighbor report elements or basic variant multi-link elements.

In some embodiments, the request may include/indicate/ specify a recommended configuration for the multi-link reconfiguration. The response may include an indication of accepting the recommended configuration, or at least one of an indication of rejecting the recommended configuration, or an alternative recommended configuration for the multi-link reconfiguration. For example, in response to an ML Configuration Request frame (see Table 5), an AP MLD may transmit an ML Configuration Response frame (see Table 6) to the non-AP MLD that indicates acceptance or rejection of the request. The AP MLD may set/update the Status Code field (e.g., field 4 of Table 6) in the ML Configuration Response frame to SUCCESS if it has accepted the request. Otherwise, the AP MLD may set/update the Status Code field in the ML Configuration Response frame to REFUSED or REJECTED or DENIED if it has not accepted the request and is not suggesting an alternative ML configuration. The AP MLD may set/update the Status Code field in the ML Configuration Response frame to REJECTED_WITH-_SUGGESTED_CHANGES if it has not accepted the request but is including a suggested alternative ML configuration in its response. In the last case, the AP MLD may include in its response a Basic variant ML element that defines an acceptable ML configuration resulting from a requested reconfiguration.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
sending, by a first wireless multilink device (MLD) to a second wireless MLD, a request for multi-link reconfiguration; and
receiving, by the first wireless MLD from the second wireless MLD, a response to the request for the multi-link reconfiguration,
wherein the first wireless MLD and the second wireless MLD maintain connection via at least one link during the multi-link reconfiguration,
wherein the request comprises a link-mapping information field that comprises (1) one or more end point description fields describing one or more end points of a link, respectively, and (2) an action field,

wherein the action field includes one of a first value indicative of adding the link, a second value indicative of removing the link, or a third value indicative of switching one end of the link, between the first wireless MLD and the second wireless MLD,
wherein the sending the request for multi-link reconfiguration comprises:
determining that the action field includes the third value and the one or more end point description fields describe the one or more end points of the link as a result of the switching, and
configuring the request as a request for switching the one end of the link between the first wireless MLD and the second wireless MLD from a first station (STA) to a second STA according to the one or more end point description fields, while the other end of the link is not changed.

2. The method of claim 1, wherein:
the first wireless MLD is an access point (AP) MLD, and the second wireless MLD is a non-AP MLD; or
the first wireless MLD is a non-AP MLD, and the second wireless MLD is an AP MLD.

3. The method of claim 2, wherein the link is between an AP station (STA) of the AP MLD and a non-AP STA of the non-AP MLD.

4. The method of claim 3, wherein the request includes a ML reconfiguration information element (IE), the ML reconfiguration IE comprising the link-mapping information field for the AP STA or the non-AP STA.

5. The method of claim 1, wherein the one or more end point description fields include at least one of: an AP end point description, or a non-AP STA end point description.

6. The method of claim 1, wherein the request and the response each comprises:
an enhanced trigger (EHT) action frame; or
a fast transition action frame.

7. The method of claim 1, wherein the request comprises a basic service set (BSS) transition management request frame including at least one of: an indication that the request is for multi-link configuration, or a BSS transition candidate list entries field that indicates zero or more of: neighbor report elements, reduced neighbor report elements or basic variant multi-link elements.

8. The method of claim 1, wherein the response comprises a basic service set (BSS) transition management response frame including a BSS transition candidate list entries field that indicates zero or more of: neighbor report elements, reduced neighbor report elements or basic variant multi-link elements.

9. The method of claim 1, wherein the request includes a recommended configuration for the multi-link reconfiguration.

10. The method of claim 9, wherein the response includes:
an indication of accepting the recommended configuration; or
at least one of: an indication of rejecting the recommended configuration, or an alternative recommended configuration for the multi-link reconfiguration.

11. A first wireless multilink device (MLD) comprising:
one or more processors; and
a transceiver configured to:
send, to a second wireless MLD, a request for multi-link reconfiguration; and
receive, from the second wireless MLD, a response to the request for the multi-link reconfiguration, wherein the first wireless MLD and the second wireless MLD maintain connection via at least one link during the multi-link reconfiguration, and wherein the request comprises a link-mapping information field that comprises (1) one or more end point description fields describing one or more end points of a link, respectively, and (2) an action field, wherein the action field includes one of a first value indicative of adding the link, a second value indicative of removing the link, or a third value indicative of switching one end of the link, between the first wireless MLD and the second wireless MLD, wherein in sending the request for multi-link reconfiguration, the one or more processors are configured to:

determine that the action field includes the third value and the one or more end point description fields describe the one or more end points of the link as a result of the switching, and configure the request as a request for switching the one end of the link between the first wireless MLD and the second wireless MLD from a first station (STA) to a second STA according to the one or more end point description fields, while the other end of the link is not changed.

12. The first wireless MLD of claim 11, wherein:
the first wireless MLD is an access point (AP) MLD, and the second wireless MLD is a non-AP MLD; or
the first wireless MLD is a non-AP MLD, and the second wireless MLD is an AP MLD.

13. The first wireless MLD of claim 12, wherein the link is between an AP station (STA) of the AP MLD and a non-AP STA of the non-AP MLD.

14. The first wireless MLD of claim 13, wherein the request includes a ML reconfiguration information element (IE), the ML reconfiguration IE comprising the link-mapping information field for the AP STA or the non-AP STA.

15. The first wireless MLD of claim 11, wherein the one or more end point description fields include at least one of: an AP end point description, or a non-AP STA end point description.

16. The first wireless MLD of claim 11, wherein the request and the response each comprises:
an extremely high throughput (EHT) action frame; or
a fast transition action frame.

17. The first wireless MLD of claim 11, wherein:
the request comprises a basic service set (BSS) transition management request frame including at least one of: an indication that the request is for multi-link configuration, or a BSS transition candidate list entries field that indicates zero or more of: neighbor report elements, reduced neighbor report elements or basic variant multi-link elements; and the response comprises a basic service set (BSS) transition management response frame including a BSS transition candidate list entries field that indicates zero or more of: neighbor report elements, reduced neighbor report elements or basic variant multi-link elements.

18. A method comprising:
sending, by a first wireless multilink device (MLD) to a second wireless MLD, a notification including a first recommendation on multi-link reconfiguration;

in response to receiving the notification, modifying, by the second wireless MLD, the first recommendation and sending, to the first wireless MLD, a request for multi-link reconfiguration including the modified first recommendation; and in response to receiving the request, determining, by the first wireless MLD, whether the request is accepted or rejected, and sending a response including a result of the determination to the second wireless MLD, wherein the first wireless MLD and the second wireless MLD maintain connection via at least one link during the multi-link reconfiguration, and wherein the request comprises a link-mapping information field that comprises (1) one or more end point description fields describing one or more end points of a link, respectively, and (2) an action field, wherein the action field includes one of a first value indicative of adding the link, a second value indicative of removing the link, or a third value indicative of switching one end of the link, between the first wireless MLD and the second wireless MLD, wherein the sending the request for multi-link reconfiguration comprises:

determining that the action field includes the third value and the one or more end point description fields describe the one or more end points of the link as a result of the switching, and configuring the request as a request for switching the one end of the link between the first wireless MLD and the second wireless MLD from a first station (STA) to a second STA according to the one or more end point description fields, while the other end of the link is not changed.

19. The method of claim 18, wherein the first wireless MLD is an access point (AP) MLD, and the second wireless MLD is a non-AP MLD.

* * * * *